US010671342B2

(12) United States Patent
Huang et al.

(10) Patent No.: US 10,671,342 B2
(45) Date of Patent: Jun. 2, 2020

(54) NON-CONTACT GESTURE CONTROL METHOD, AND ELECTRONIC TERMINAL DEVICE

(71) Applicant: Huawei Technologies Co., Ltd., Shenzhen, Guangdong (CN)

(72) Inventors: Maosheng Huang, Shenzhen (CN); Shouyu Wang, Shenzhen (CN); Shanfu Li, Shenzhen (CN); Kangmin Huang, Shenzhen (CN); Yulin Zheng, Shenzhen (CN); Kewei Yi, Shenzhen (CN); Liang Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/812,917

(22) Filed: Jul. 29, 2015

(65) Prior Publication Data

US 2015/0331668 A1 Nov. 19, 2015

Related U.S. Application Data

(63) Continuation of application No. PCT/CN2014/070662, filed on Jan. 15, 2014.

(30) Foreign Application Priority Data

Jan. 31, 2013 (CN) .......................... 2013 1 0037705

(51) Int. Cl.
*G06F 3/16* (2006.01)
*G06F 3/01* (2006.01)
(Continued)

(52) U.S. Cl.
CPC .............. *G06F 3/167* (2013.01); *G06F 3/011* (2013.01); *G06F 3/013* (2013.01); *G06F 3/015* (2013.01);
(Continued)

(58) Field of Classification Search
CPC .......... G06F 3/167; G06F 3/011; G06F 3/017; G06F 3/038; G06F 3/015; G06F 3/013;
(Continued)

(56) References Cited

U.S. PATENT DOCUMENTS 4,040,048 A * 8/1977 Lien ..................... G06F 15/0225
345/33
4,089,124 A * 5/1978 Burtis .................. G09B 19/025
434/201
(Continued)

FOREIGN PATENT DOCUMENTS

CN 102339125 A 2/2012
CN 102486789 A 6/2012
(Continued)

OTHER PUBLICATIONS

Cao et al.,"Evaluation of an On-line Adaptive Gesture Interface with Command Prediction," XP058177128, pp. 187-194, Department of Computer Science University of Toronto (May 7, 2005).

*Primary Examiner* — Christopher E Leiby
(74) *Attorney, Agent, or Firm* — Leydig, Voit & Mayer, Ltd.

(57) ABSTRACT

A method includes: receiving an A1 gesture motion of a user, where the A1 gesture motion is not in contact with the electronic terminal device; obtaining, an A1 control instruction corresponding to the A1 gesture motion, where the A1 control instruction is used to control the electronic terminal device; obtaining an A2 control instruction of the user within a preset delay period, where the preset delay period is less than three seconds and the A2 control instruction is used to control the electronic terminal device; and comparing the A1 control instruction with the A2 control instruction, where if the A1 control instruction is consistent with the A2 control instruction, the electronic terminal device does not perform an operation corresponding to the A2 control instruction;

(Continued)

and if the A1 control instruction is inconsistent with the A2 control instruction, the electronic terminal device performs the operation corresponding to the A2 control instruction.

16 Claims, 20 Drawing Sheets

(51) Int. Cl.
*G06F 3/038* (2013.01)
*G06K 9/00* (2006.01)
*G06F 3/03* (2006.01)

(52) U.S. Cl.
CPC ............ *G06F 3/017* (2013.01); *G06F 3/0304* (2013.01); *G06F 3/038* (2013.01); *G06K 9/00335* (2013.01); *G06F 2203/0381* (2013.01)

(58) Field of Classification Search
CPC .......... G06F 3/0304; G06F 2203/0381; G06K 9/00335
See application file for complete search history.

(56) References Cited

U.S. PATENT DOCUMENTS

| | | | | |
|---|---|---|---|---|
| 5,025,411 A * | 6/1991 | Tallman | ................ | G01R 13/22 345/173 |
| 6,323,846 B1 * | 11/2001 | Westerman | ........... | G06F 3/0235 345/173 |
| 6,636,763 B1 * | 10/2003 | Junker | .................... | G06F 3/013 340/4.11 |
| 8,619,029 B2 * | 12/2013 | Alameh | .................. | G06F 3/017 345/156 |
| 8,882,666 B1 * | 11/2014 | Goldberg | ............. | A61B 5/6838 600/301 |
| 2004/0064597 A1 * | 4/2004 | Trewin | .................... | G06F 3/023 710/8 |
| 2005/0134117 A1 | 6/2005 | Ito et al. | | |
| 2005/0253814 A1 * | 11/2005 | Ghassabian | ........... | G06F 1/1616 345/168 |
| 2005/0288934 A1 | 12/2005 | Omi | | |
| 2006/0209013 A1 * | 9/2006 | Fengels | ................. | G06F 3/0325 345/156 |
| 2007/0239432 A1 * | 10/2007 | Soong | .................... | G06F 17/27 704/9 |
| 2008/0120437 A1 * | 5/2008 | Butterfield | ............ | G06F 3/0233 710/5 |
| 2008/0287147 A1 | 11/2008 | Grant et al. | | |
| 2009/0103780 A1 | 4/2009 | Nishihara et al. | | |
| 2010/0149090 A1 * | 6/2010 | Morris | .................... | G06F 3/017 345/156 |
| 2010/0254626 A1 * | 10/2010 | Yamaguchi | ........... | G06F 3/1211 382/276 |
| 2010/0295781 A1 * | 11/2010 | Alameh | .................. | G06F 3/017 345/158 |
| 2011/0234492 A1 * | 9/2011 | Ajmera | .................... | G06F 3/017 345/158 |
| 2011/0310010 A1 * | 12/2011 | Hoffnung | ................ | G06F 3/017 345/157 |
| 2012/0009896 A1 * | 1/2012 | Bandyopadhyay | ... | G06F 1/1643 455/411 |
| 2012/0098783 A1 * | 4/2012 | Badaye | ................. | G06F 3/0416 345/174 |
| 2012/0249416 A1 | 10/2012 | Maciocci et al. | | |
| 2012/0257035 A1 | 10/2012 | Larsen | | |
| 2013/0007616 A1 * | 1/2013 | Bell | ........................ | G06F 3/017 715/709 |
| 2013/0088419 A1 * | 4/2013 | Kim | ........................ | G09G 5/00 345/156 |
| 2013/0271397 A1 * | 10/2013 | MacDougall | ........... | G06F 3/017 345/173 |
| 2013/0307765 A1 | 11/2013 | Li | | |
| 2014/0078318 A1 * | 3/2014 | Alameh | ................. | G06F 3/0304 348/207.99 |
| 2014/0160030 A1 * | 6/2014 | Wright | .................. | G06F 3/0489 345/173 |
| 2014/0218300 A1 * | 8/2014 | Muraki | .................. | G03B 17/54 345/168 |
| 2014/0258443 A1 * | 9/2014 | Stone | .................... | H04L 65/605 709/217 |
| 2014/0354534 A1 * | 12/2014 | Mullins | .................... | G06F 3/015 345/156 |
| 2016/0021238 A1 * | 1/2016 | Abramson | ............ | H04W 48/04 455/418 |

FOREIGN PATENT DOCUMENTS

| | | |
|---|---|---|
| CN | 102830891 A | 12/2012 |
| KR | 20100017875 | 2/2010 |
| KR | 20100062413 | 6/2010 |
| WO | WO 2006/070074 A1 | 7/2006 |
| WO | WO 2012/011614 A1 | 1/2012 |
| WO | WO 2012/126426 A2 | 9/2012 |

* cited by examiner

NON-CONTACT GESTURE CONTROL METHOD, AND ELECTRONIC TERMINAL DEVICE

CROSS-REFERENCE TO RELATED APPLICATIONS

This application is a continuation of International Application No. PCT/CN2014/070662, filed on Jan. 15, 2014, which claims priority to Chinese Patent Application No. 201310037705.6, filed on Jan. 31, 2013, both of which are hereby incorporated by reference in their entireties.

TECHNICAL FIELD

The present invention pertains to the field of human-machine interaction technologies, and in particular, to a non-contact gesture control method for controlling an electronic terminal device and the electronic terminal device.

BACKGROUND

Controlling a device by using a gesture is one of human-machine interaction technologies. Compared with conventional mouse or keyboard input, gesture control does not require a user to hold a specified input device, and requires only a specified hand motion, to control a device or input specified information into a device. Due to convenience and interestingness of a non-contact gesture, the non-contact gesture is being widely used for controlling a computer terminal, a mobile terminal, a television terminal, and the like in the industry.

In the prior art, non-contact gesture control indicates that, an image that is obtained from space and carries depth information is analyzed and extracted by using an image recognition technology, a motion of a gesture in the image is analyzed, and a control command is obtained by matching a template of the motion of the gesture with the control command, and then the corresponding control command is executed to achieve a control purpose.

The prior art has the following disadvantages: A user worries that a gesture motion is not recognized and usually continually makes a same gesture motion to strengthen the user's intention; or when making a gesture motion, a user sends a voice command or a lip command, or sends a same command by using a brain wave, so that all these repeated commands are repeatedly recognized, which causes a misoperation.

SUMMARY

Embodiments of the present invention aim to provide a non-contact gesture control method, and an electronic terminal device, so as to solve a problem in the prior art that a user worries that a gesture motion is not recognized and usually continually makes a same gesture motion to strengthen sending of a same command, and these repeated commands are repeatedly recognized, which causes a misoperation.

An embodiment of the present invention is implemented as follows: A non-contact gesture control method is provided and is used to control an electronic terminal device, where the method includes:

receiving an A1 gesture motion of a user, where the A1 gesture motion is not in contact with the electronic terminal device;

obtaining, by means of recognition, an A1 control instruction corresponding to the A1 gesture motion, where the A1 control instruction is used to control the electronic terminal device so that the electronic terminal device performs an operation corresponding to the A1 control instruction;

obtaining an A2 control instruction of the user within a preset delay period, where the preset delay period is less than three seconds and the A2 control instruction is used to control the electronic terminal device; and comparing the A1 control instruction with the A2 control instruction, where if the A1 control instruction is consistent with the A2 control instruction, the electronic terminal device does not perform an operation corresponding to the A2 control instruction; and if the A1 control instruction is inconsistent with the A2 control instruction, the electronic terminal device performs the operation corresponding to the A2 control instruction.

According to the non-contact gesture control method in this embodiment of the present invention, the obtaining an A2 control instruction of the user within a preset delay period includes:

receiving an A2 gesture motion of the user within the preset delay period, where the A2 gesture motion is not in contact with the electronic terminal device; and obtaining, according to a pre-stored mapping relationship between a gesture motion and a control instruction, the A2 control instruction corresponding to the A2 gesture motion; or receiving an A1 voice command of the user within the preset delay period; and obtaining, according to a pre-stored mapping relationship between a voice command and a control instruction, the A2 control instruction corresponding to the A1 voice command; or receiving an A1 signal which shows lip motion of the user within the preset delay period; and obtaining, according to a pre-stored mapping relationship between a signal which shows lip motion and a control instruction, the A2 control instruction corresponding to the A1 signal which shows lip motion; or receiving an A1 brain wave signal of the user within the preset delay period; and obtaining, according to a pre-stored mapping relationship between a brain wave signal and a control instruction, the A2 control instruction corresponding to the A1 brain wave signal.

According to the non-contact gesture control method in this embodiment of the present invention, before the receiving an A1 gesture motion of a user, the method further includes:

obtaining a line-of-sight focus of the user and determining an A1 controlled object, where the A1 controlled object is an operable object displayed on the electronic terminal device;

where that the electronic terminal device performs an operation corresponding to the A1 control instruction includes:

performing, by the electronic terminal device, an operation on the A1 controlled object according to the A1 control instruction.

Compared with the prior art, beneficial effects achieved in this embodiment of the present invention are as follows: By using repeated gesture motions, or combining gesture recognition and a voice recognition command, or combing gesture recognition and a lip recognition command, or combining gesture recognition and a brain wave recognition command, or combining gesture recognition and line-of-sight tracking, a user can repeat a command to strengthen a command expected to be executed; a system recognizes that multiple repeated commands from the user emphasize only one command, and does not execute the command repeatedly, which avoids a misoperation caused by multiple repeated gestures of the user. Correctness and reliability of non-contact gesture control are improved by using technologies of the present invention.

An embodiment of the present invention further provides a non-contact gesture control method, which is used to control an electronic terminal device, where the method includes:

receiving a B1 gesture motion of a user, where the B1 gesture motion is not in contact with the electronic terminal device;

obtaining, according to a pre-stored mapping relationship between a gesture motion and a control instruction, a B1 control instruction corresponding to the B1 gesture motion, where the B1 control instruction is used to control the electronic terminal device so that the electronic terminal device performs an operation corresponding to the B1 control instruction;

receiving a B2 gesture motion of the user, where the B2 gesture motion is not in contact with the electronic terminal device; and determining, according to the pre-stored mapping relationship between a gesture motion and a control instruction, whether the B2 gesture motion is a preset confirmation instruction, where if the B2 gesture motion is the preset confirmation instruction, the electronic terminal device performs the operation corresponding to the B1 control instruction, where the confirmation instruction is used to trigger the electronic terminal device to perform the operation corresponding to the B1 control instruction.

Beneficial effects in this embodiment of the present invention are as follows: Confirming a command of non-contact gesture control for a second time improves correctness and reliability of the non-contact gesture control.

An embodiment of the present invention further provides a non-contact gesture control method, which is used to control an electronic terminal device, where the method includes:

receiving a C1 gesture motion of a user, where the C1 gesture motion is not in contact with the electronic terminal device;

obtaining, according to a pre-stored mapping relationship between a gesture motion and a control instruction, a C1 control instruction corresponding to the C1 gesture motion, where the C1 control instruction is used to control the electronic terminal device so that the electronic terminal device performs an operation corresponding to the C1 control instruction;

determining whether a mapping relationship between the C1 gesture motion and the C1 control instruction is enabled; and if the mapping relationship between the C1 gesture motion and the C1 control instruction is disabled, skipping performing, by the electronic terminal device, the operation corresponding to the C1 control instruction; and if the mapping relationship between the C1 gesture motion and the C1 control instruction is enabled, performing, by the electronic terminal device, the operation corresponding to the C1 control instruction.

Beneficial effects in this embodiment of the present invention are as follows: A correspondence between a command of non-contact gesture control and a gesture motion may be set to enabled or disabled, so that a non-contact gesture motion with a high misrecognition rate can be disabled, thereby improving correctness and reliability of the non-contact gesture control.

An embodiment of the present invention further provides a non-contact gesture control method, which is used to control an electronic terminal device, where the method includes:

receiving a D1 gesture motion of a user, where the D1 gesture motion is not in contact with the electronic terminal device;

obtaining, according to a pre-stored mapping relationship between a gesture motion and a control instruction, a D1 control instruction corresponding to the D1 gesture motion, where the D1 control instruction is used to control the electronic terminal device so that the electronic terminal device performs an operation corresponding to the D1 control instruction;

obtaining a D2 control instruction of the user; and if the D2 control instruction is a cancellation instruction, recording the number of times for which the D2 control instruction is the cancellation instruction, where the cancellation instruction is used to instruct to cancel execution of the D1 control instruction; and determining whether the number of times for which the D2 control instruction is the cancellation instruction exceeds the preset number of cancellation time; and if the number of times for which the D2 control instruction is the cancellation instruction exceeds the preset number of cancellation times, setting a mapping relationship between the D1 gesture motion and the D1 control instruction to disabled, or prompting a mapping relationship between the D1 gesture motion and the D1 control instruction to be cancelled.

According to the non-contact gesture control method in this embodiment of the present invention, the obtaining a D2 control instruction of the user includes:

receiving a D2 gesture motion of the user, where the D2 gesture motion is not in contact with the electronic terminal device; and obtaining, according to the pre-stored mapping relationship between a gesture motion and a control instruction, the D2 control instruction corresponding to the D2 gesture motion; or receiving a D1 voice command of the user; and obtaining, according to a pre-stored mapping relationship between a voice command and a control instruction, the D2 control instruction corresponding to the D1 voice command; or receiving a D1 signal which shows lip motion of the user; and obtaining, according to a pre-stored mapping relationship between a signal which shows lip motion and a control instruction, the D2 control instruction corresponding to the D1 signal which shows lip motion; or receiving a D1 brain wave signal of the user; and obtaining, according to a pre-stored mapping relationship between a brain wave signal and a control instruction, the D2 control instruction corresponding to the D1 brain wave signal.

Beneficial effects in this embodiment of the present invention are as follows: By determining the number of times for which a gesture motion of non-contact gesture control is cancelled, a gesture motion that causes multiple misoperations is adjusted to improve recognition accuracy of a non-contact gesture control instruction, thereby improving control correctness and reliability.

An embodiment of the present invention further provides a non-contact gesture control method, which is used to control an electronic terminal device, where the method includes:

receiving an unlocking command of a user, where the electronic terminal device executes the unlocking command so as to terminate a locking state and enter a state in which a non-contact gesture motion can be received;

receiving an E1 gesture motion of the user, where the E1 gesture motion is not in contact with the electronic terminal device; and obtaining, according to a pre-stored mapping relationship between a gesture motion and a control instruction, an E1 control instruction corresponding to the E1 gesture motion, where the E1 control instruction is used to control the electronic terminal device so that the electronic terminal device performs an operation corresponding to the E1 control instruction.

Beneficial effects in this embodiment of the present invention are as follows: Locking and unlocking of non-contact gesture control are controlled to prevent a non-contact gesture control apparatus from generating a misoperation control instruction when the apparatus is controlled by an unintentional non-contact gesture of a user, which improves control correctness and reliability.

An embodiment of the present invention further provides an electronic terminal device controlled by a non-contact gesture, where the electronic terminal device includes an A gesture motion receiving unit, an A control instruction acquiring unit, an A timer, an A control instruction comparing unit, and an A control instruction executing unit, where:

the A gesture motion receiving unit is configured to receive an A1 gesture motion of a user and an A2 gesture motion after the A1 gesture motion, where the A1 gesture motion and the A2 gesture motion are not in contact with the electronic terminal device;

the A control instruction acquiring unit is configured to obtain, according a pre-stored mapping relationship between a gesture motion and a control instruction, an A1 control instruction corresponding to the A1 gesture motion that is received by the A gesture motion receiving unit and an A2 control instruction corresponding to the A2 gesture motion that is received by the A gesture motion receiving unit, where the A1 control instruction and the A2 control instruction are used to control the electronic terminal device;

the A timer is configured to record a time interval between obtaining the A1 control instruction by the A control instruction acquiring unit and obtaining the A2 control instruction by the A control instruction acquiring unit, or is configured to record a time interval between receiving the A1 gesture motion by the A gesture motion receiving unit and receiving the A2 gesture motion by the A gesture motion receiving unit;

the A control instruction comparing unit is configured to: when the time interval recorded by the A timer is less than preset time, compare the A2 control instruction with the A1 control instruction, and determine whether the A2 control instruction is consistent with the A1 control instruction, where the preset time is less than three seconds; and the A control instruction executing unit is configured to: perform an operation corresponding to the A1 control instruction; when a comparing result of the A control instruction comparing unit is that the A2 control instruction is consistent with the A1 control instruction, skip performing an operation corresponding to the A2 control instruction; and when the comparing result of the A control instruction comparing unit is that the A2 control instruction is inconsistent with the A1 control instruction, perform the operation corresponding to the A2 control instruction.

According to the electronic terminal device controlled by a non-contact gesture in this embodiment of the present invention, the electronic terminal device further includes an A line-of-sight tracking unit, configured to track a line of sight of the user to obtain an A controlled object that is focused by the user, where the A controlled object is an operable object displayed on the electronic terminal device;

where the A control instruction executing unit is further configured to: perform, on the A controlled object, the operation corresponding to the A1 control instruction; when the comparing result of the A control instruction comparing unit is that the A2 control instruction is consistent with the A1 control instruction, skip performing, on the A controlled object, the operation corresponding to the A2 control instruction; and when the comparing result of the A control instruction comparing unit is that the A2 control instruction is inconsistent with the A1 control instruction, perform, on the A controlled object, the operation corresponding to the A2 control instruction.

Compared with the prior art, beneficial effects achieved in this embodiment of the present invention are as follows: A user can repeat a command by using repeated gesture motions to strengthen a command expected to be executed; a system recognizes that multiple repeated commands from the user emphasize only one command, and does not execute the command repeatedly, which avoids a misoperation caused by multiple repeated gestures of the user, thereby improving correctness and reliability of non-contact gesture control.

An embodiment of the present invention further provides an electronic terminal device controlled by a non-contact gesture, where the electronic terminal device includes an A1 gesture motion receiving unit, an A1 control instruction acquiring unit, an A2 control instruction acquiring unit, an A1 timer, an A1 control instruction comparing unit, and an A1 control instruction executing unit, where:

the A1 gesture motion receiving unit is configured to receive an A1 gesture motion of a user, where the A1 gesture motion is not in contact with the electronic terminal device;

the A1 control instruction acquiring unit is configured to obtain, according to a pre-stored mapping relationship between a gesture motion and a control instruction, an A1 control instruction corresponding to the A1 gesture motion that is received by the A1 gesture motion receiving unit, where the A1 control instruction is used to control the electronic terminal device;

the A2 control instruction acquiring unit is configured to obtain an A2 control instruction, where the A2 control instruction is used to control the electronic terminal device;

the A1 timer is configured to record a time interval between obtaining the A1 control instruction by the A1 control instruction acquiring unit and obtaining the A2 control instruction by the A2 control instruction acquiring unit;

the A1 control instruction comparing unit is configured to: when the time interval recorded by the A1 timer is less than preset time, compare the A1 control instruction with the A2 control instruction, and determine whether the A1 control instruction is consistent with the A2 control instruction, where the preset time is less than three seconds; and the A1 control instruction executing unit is configured to: perform an operation corresponding to the A1 control instruction; when a comparing result of the A1 control instruction comparing unit is that the A1 control instruction is consistent with the A2 control instruction, skip performing an operation corresponding to the A2 control instruction; and when the comparing result of the A control instruction comparing unit is that the A1 control instruction is inconsistent with the A2 control instruction, perform the operation corresponding to the A2 control instruction.

According to the electronic terminal device controlled by a non-contact gesture in this embodiment of the present invention, the A2 control instruction acquiring unit includes: an A1 voice receiving unit and an A1 voice recognition unit, where:

the A1 voice receiving unit is configured to receive an A1 voice command of the user; and the A1 voice recognition unit is configured to recognize the A1 voice command received by the A1 voice receiving unit; and obtain the A2 control instruction corresponding to the A1 voice command;

alternatively, the A2 control instruction acquiring unit includes an A1 signal which shows lip motion receiving unit and an A1 lip recognition unit, where:

the A1 signal which shows lip motion receiving unit is configured to receive an A1 signal which shows lip motion of the user; and the A1 lip recognition unit is configured to recognize the A1 signal which shows lip motion received by the A1 signal which shows lip motion receiving unit; and obtain the A2 control instruction corresponding to the A1 signal which shows lip motion;

alternatively, the A2 control instruction acquiring unit includes an A1 brain wave receiving unit and an A1 brain wave recognition unit, where:

the A1 brain wave receiving unit is configured to receive an A1 brain wave signal of the user; and the A1 brain wave recognition unit is configured to recognize the A1 brain wave signal received by the A1 brain wave receiving unit; and obtain the A2 control instruction corresponding to the A1 brain wave signal.

According to the electronic terminal device controlled by a non-contact gesture in this embodiment of the present invention, the electronic terminal device further includes an A1 line-of-sight tracking unit, configured to track a line of sight of the user to obtain an A1 controlled object that is focused by the user, where the A1 controlled object is an operable object displayed on the electronic terminal device;

where the A1 control instruction executing unit is further configured to: perform, on the A1 controlled object, the operation corresponding to the A1 control instruction; when the comparing result of the A1 control instruction comparing unit is that the A1 control instruction is consistent with the A2 control instruction, skip performing, on the A1 controlled object, the operation corresponding to the A2 control instruction; and when the comparing result of the A1 control instruction comparing unit is that the A1 control instruction is inconsistent with the A2 control instruction, perform, on the A1 controlled object, the operation corresponding to the A2 control instruction.

Beneficial effects in this embodiment of the present invention are as follows: By combining gesture recognition and a voice recognition command, or combing gesture recognition and a lip recognition command, or combining gesture recognition and a brain wave recognition command, or combining gesture recognition and line-of-sight tracking, a user can repeat a command by using multiple means to strengthen a command expected to be executed; a system recognizes that multiple repeated commands from the user emphasize only one command, and does not execute the command repeatedly, which avoids a misoperation caused by multiple repeated gestures of the user. Correctness and reliability of non-contact gesture control are improved by using technologies of the present invention.

An embodiment of the present invention further provides an electronic terminal device controlled by a non-contact gesture, where the electronic terminal device includes a D gesture motion receiving unit, a D control instruction acquiring unit, a D storage unit, and a D mapping relationship establishing unit, where:

the D gesture motion receiving unit is configured to receive a D1 gesture motion of a user and a D2 gesture motion after the D1 gesture motion, where the D1 gesture motion and the D2 gesture motion are not in contact with the electronic terminal device;

the D control instruction acquiring unit is configured to obtain, according a pre-stored mapping relationship between a gesture motion and a control instruction, a D1 control instruction corresponding to the D1 gesture motion that is received by the D gesture motion receiving unit and a D2 control instruction corresponding to the D2 gesture motion that is received by the D gesture motion receiving unit, where the D1 control instruction and the D2 control instruction are used to control the electronic terminal device;

the D storage unit is configured to: when the D2 control instruction is a cancellation instruction, record the number of times for which the D2 control instruction is the cancellation instruction, where the cancellation instruction is used to instruct to cancel execution of the D1 control instruction; and the D mapping relationship establishing unit is configured to: establish and store the mapping relationship between a gesture motion and a control instruction; and when it is determined that the number of times for which the D2 control instruction is the cancellation instruction and which is recorded by the D storage unit reaches or exceeds the preset number of cancellation times, re-set a gesture motion corresponding to the D1 control instruction in the mapping relationship to reduce misrecognition of the gesture motion.

According to the electronic terminal device controlled by a non-contact gesture in this embodiment of the present invention, the electronic terminal device further includes a D prompting unit, configured to: when the number of times for which the D2 control instruction is the cancellation instruction reaches or exceeds the preset number of cancellation times, prompt the user to cancel a mapping relationship between the D1 gesture motion and the D1 control instruction.

Beneficial effects in this embodiment of the present invention are as follows: The electronic terminal device controlled by a non-contact gesture in the present invention recognizes a misoperation of a command of non-contact gesture control and adjusts a gesture motion that is often misrecognized, so as to improve recognition accuracy of anon-contact gesture control instruction, thereby improving control correctness and reliability.

An embodiment of the present invention further provides an electronic terminal device controlled by a non-contact gesture, where the electronic terminal device includes a D1 gesture motion receiving unit, a D1 control instruction acquiring unit, a D2 control instruction acquiring unit, a D1 storage unit, and a D1 mapping relationship establishing unit, where:

the D1 gesture motion receiving unit is configured to receive a D1 gesture motion of a user, where the D1 gesture motion is not in contact with the electronic terminal device;

the D1 control instruction acquiring unit is configured to obtain, according to a pre-stored mapping relationship between a gesture motion and a control instruction, a D1 control instruction corresponding to the D1 gesture motion that is received by the D1 gesture motion receiving unit, where the D1 control instruction is used to control the electronic terminal device;

the D2 control instruction acquiring unit is configured to obtain a D2 control instruction, where the D2 control instruction is used to control the electronic terminal device;

the D1 storage unit is configured to: when the D2 control instruction is a cancellation instruction, record the number of times for which the D2 control instruction is the cancellation instruction, where the cancellation instruction is used to instruct to cancel execution of the D1 control instruction; and the D1 mapping relationship establishing unit is configured to establish and store the mapping relationship between a gesture motion and a control instruction; and when it is determined that the number of times for which the D2 control instruction is the cancellation instruction and which is recorded by the D1 storage unit reaches or exceeds the preset number of cancellation times, re-set a gesture motion corresponding to the D1 control instruction in the mapping relationship to eliminate misrecognition of the gesture motion.

According to the electronic terminal device controlled by a non-contact gesture in this embodiment of the present invention, the D2 control instruction acquiring unit includes: a D1 voice receiving unit and a D1 voice recognition unit, where:

the D1 voice receiving unit is configured to receive a D1 voice command of the user; and the D1 voice recognition unit is configured to recognize the D1 voice command received by the D1 voice receiving unit; and obtain the D2 control instruction corresponding to the D1 voice command;

alternatively, the D2 control instruction acquiring unit includes a D1 signal which shows lip motion receiving unit and a D1 lip recognition unit, where:

the D1 signal which shows lip motion receiving unit is configured to receive a D1 signal which shows lip motion of the user; and the D1 lip recognition unit is configured to recognize the D1 signal which shows lip motion received by the D1 signal which shows lip motion receiving unit; and obtain the D2 control instruction corresponding to the D1 signal which shows lip motion;

alternatively, the D2 control instruction acquiring unit includes a D1 brain wave receiving unit and a D1 brain wave recognition unit, where:

the D1 brain wave receiving unit is configured to receive a D1 brain wave signal of the user; and the D1 brain wave recognition unit is configured to recognize the D1 brain wave signal received by the D1 brain wave receiving unit; and obtain the D2 control instruction corresponding to the D1 brain wave signal.

According to the electronic terminal device controlled by a non-contact gesture in this embodiment of the present invention, the electronic terminal device further includes a D1 prompting unit, configured to: when the number of times for which the D2 control instruction is the cancellation instruction reaches or exceeds the preset number of cancellation times, prompt the user to cancel a mapping relationship between the D1 gesture motion and the D1 control instruction.

Beneficial effects in this embodiment of the present invention are as follows: The electronic terminal device controlled by a non-contact gesture in the present invention recognizes a misoperation of a command of non-contact gesture control and adjusts a gesture motion that is often misrecognized, so as to improve recognition accuracy of anon-contact gesture control instruction, thereby improving control correctness and reliability.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention more comprehensible, the following further specifically describes the present invention with reference to the accompanying drawings and the embodiments. It should be understood that, the described specific embodiments herein are only used to explain the present invention, but are not to limit the present invention.

Figure 1:
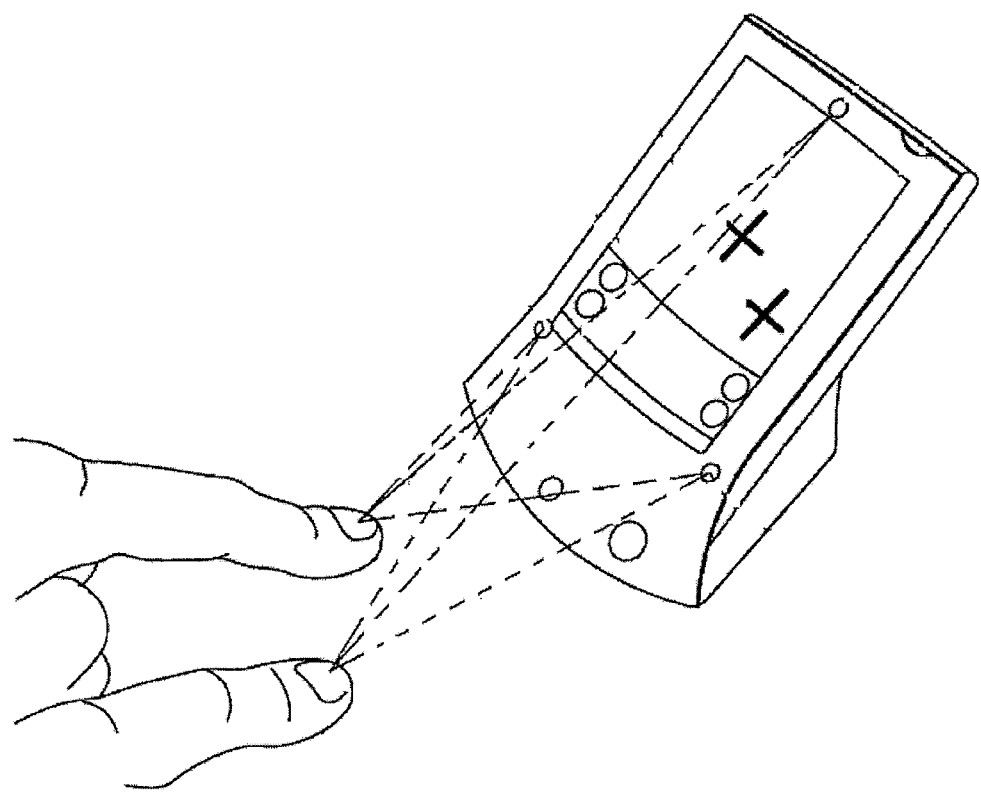
FIG. 1 is a schematic diagram of an application scenario of a technology according to the present invention.

In order to describe the technical solutions of the present invention, the following uses specific embodiments for description. FIG. 1 shows an example of an application implementation scenario of a method and an electronic terminal device according to the embodiments of the present invention, an electronic terminal device controlled by a non-contact gesture provided in an embodiment of the present invention may include but is not limited to a computer terminal, a mobile telephone terminal, a tablet computer, a television terminal, and the like.

Figure 2:
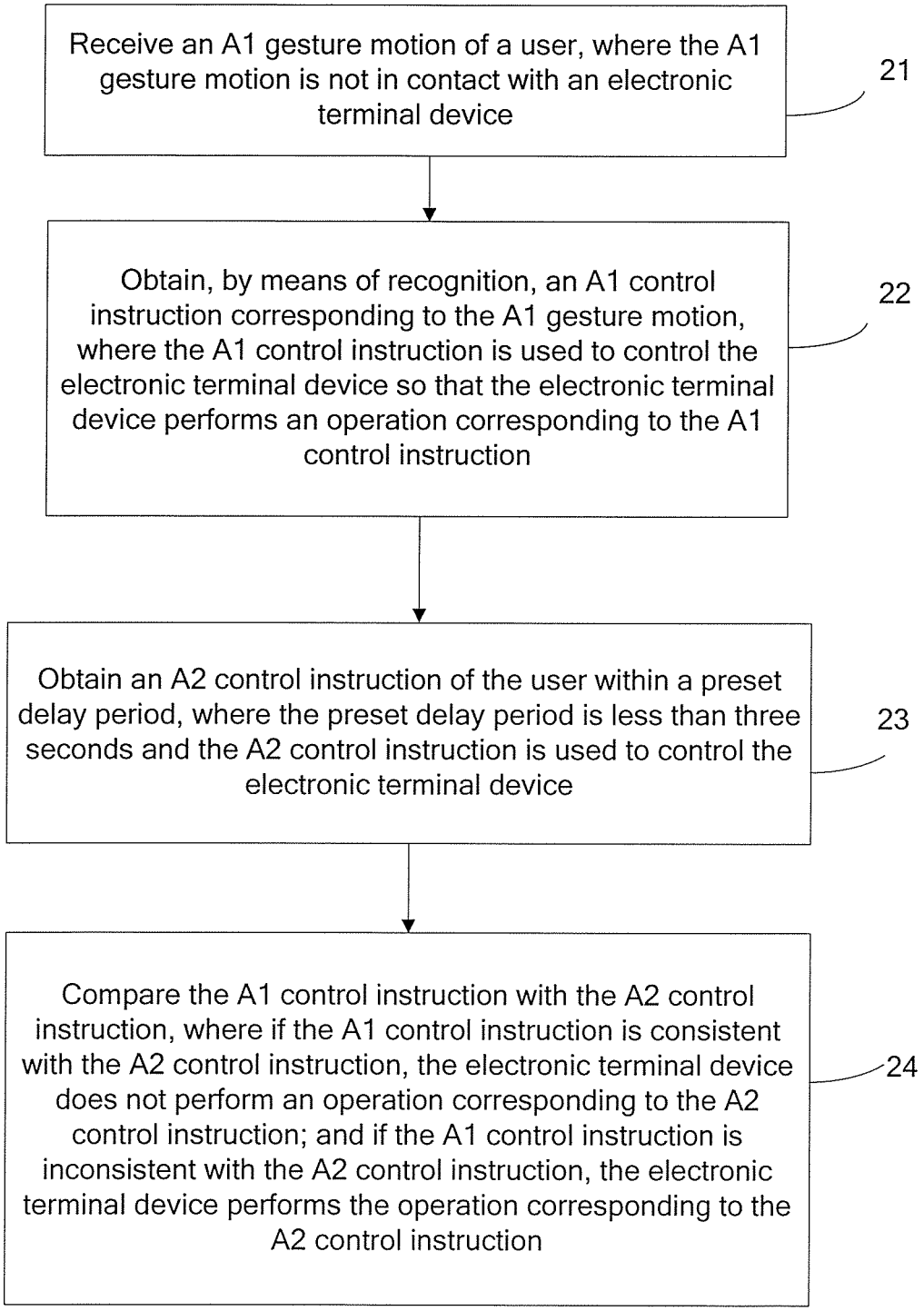
FIG. 2 is a flowchart of implementation of anon-contact gesture control method according to Embodiment 1 of the present invention.

FIG. 2 shows an implementation procedure of a non-contact gesture control method for controlling an electronic terminal device according to Embodiment 1 of the present invention, and a detailed process of the method is as follows:

Step 21: Receive an A1 gesture motion of a user, where the A1 gesture motion is not in contact with the electronic terminal device.

In this embodiment, multiple manners may be used to receive a gesture motion of the user, which include but are not limited to collecting a gesture image of the user by using an image collector, and extracting a gesture motion from the gesture image; or receiving a gesture motion of the user by using a reflection gesture tracker, infrared gesture tracking tracker, or an ultrasonic gesture tracker.

Step 22: Obtain, by means of recognition, an A1 control instruction corresponding to the A1 gesture motion, where the A1 control instruction is used to control the electronic terminal device so that the electronic terminal device performs an operation corresponding to the A1 control instruction.

Step 23: Obtain an A2 control instruction of the user within a preset delay period, where the preset delay period is less than three seconds and the A2 control instruction is used to control the electronic terminal device. Herein, the preset delay period is an instruction response period that can be accepted by the user, and is usually less than three seconds. The preset delay period may be preset when the electronic terminal device is delivered from the factory, and may also be set by the user in a configuration manner.

Step 24: Compare the A1 control instruction with the A2 control instruction, where if the A1 control instruction is consistent with the A2 control instruction, the electronic terminal device does not perform an operation corresponding to the A2 control instruction; and if the A1 control instruction is inconsistent with the A2 control instruction, the electronic terminal device performs the operation corresponding to the A2 control instruction.

The obtaining an A2 control instruction of the user within a preset delay period in step 23 in Embodiment of the present invention may have multiple implementation manners.

Figure 2A:
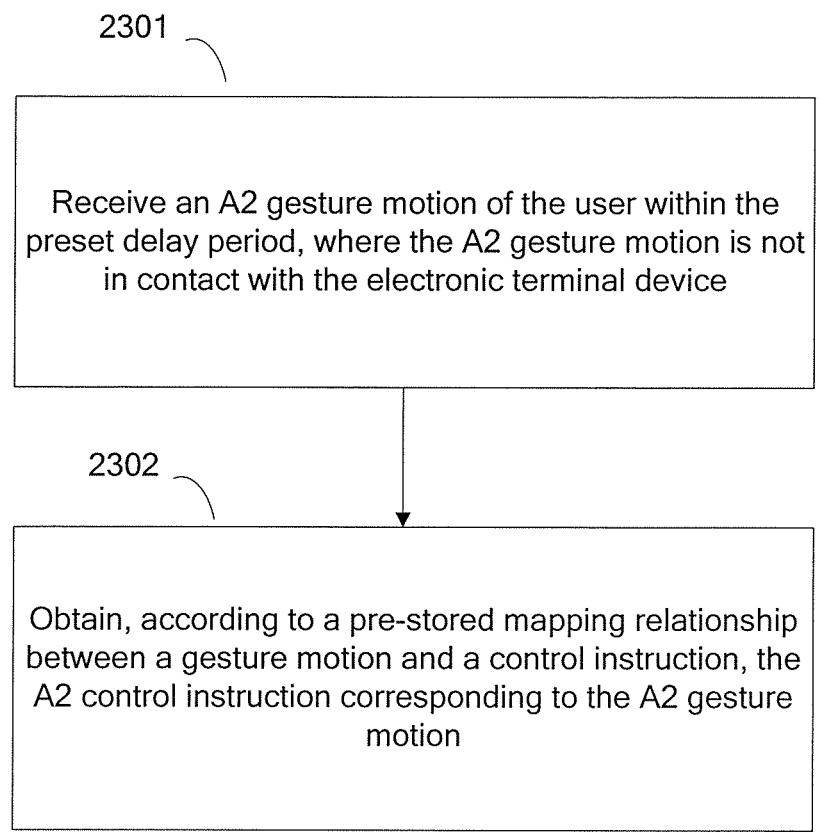
FIG. 2a, FIG. 2b, and FIG. 2c are sub-flowcharts of implementation of step 23 in Embodiment 1.

In a first implementation manner, as shown in FIG. 2a, step 23 may include:

step 2301: Receive an A2 gesture motion of the user within the preset delay period, where the A2 gesture motion is not in contact with the electronic terminal device; and step 2302: Obtain, according to a pre-stored mapping relationship between a gesture motion and a control instruction, the A2 control instruction corresponding to the A2 gesture motion.

Figure 2B:
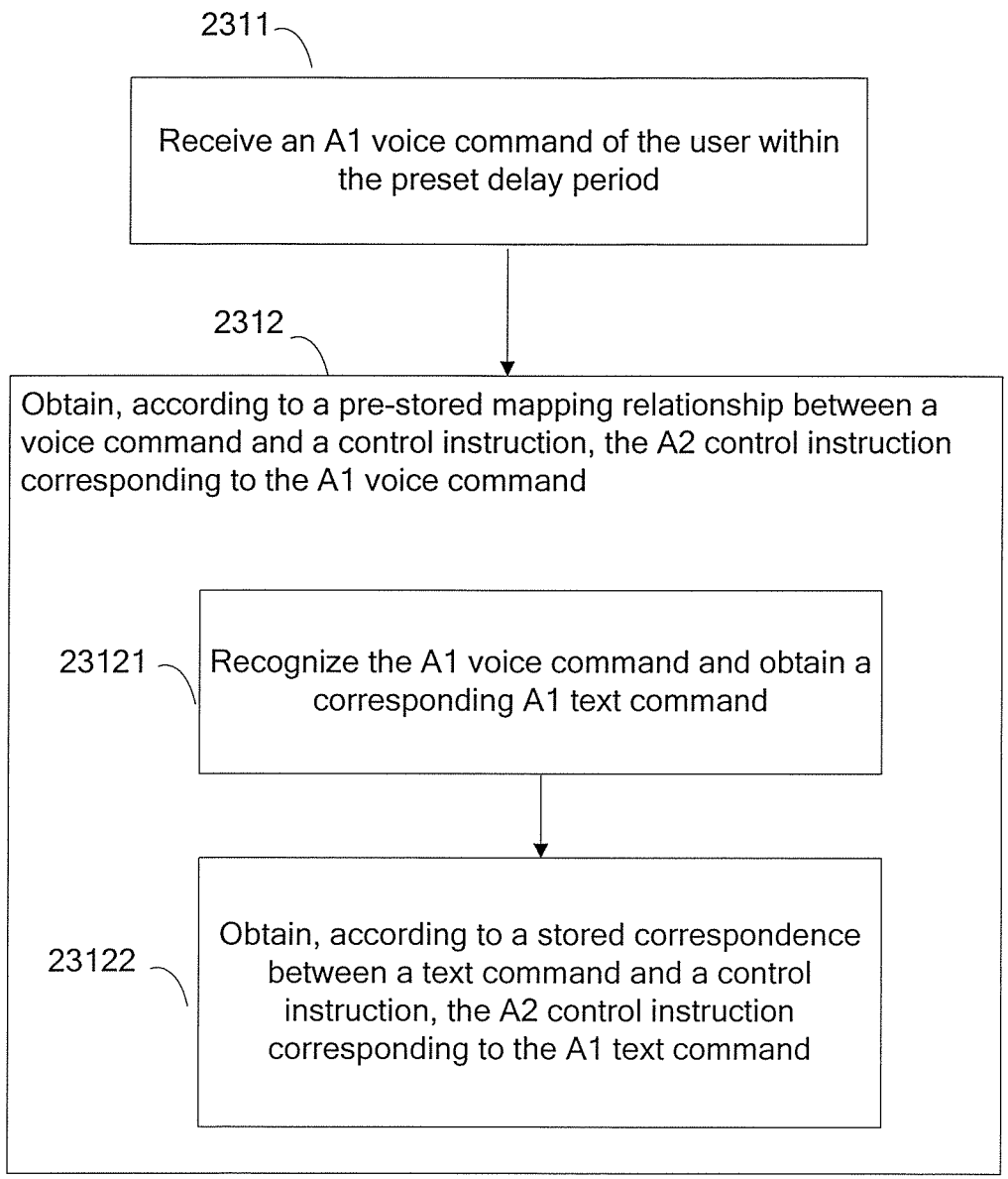

In a second implementation manner, as shown in FIG. 2b, step 23 may include:

step 2311: Receive an A1 voice command of the user within the preset delay period; and step 2312: Obtain, according to a pre-stored mapping relationship between a voice command and a control instruction, the A2 control instruction corresponding to the A1 voice command, where:

step 2312 may include:

step 23121: Recognize the A1 voice command and obtain a corresponding A1 text command; and step 23122: Obtain, according to a stored correspondence between a text command and a control instruction, the A2 control instruction corresponding to the A1 text command.

Before step 23122, the following step may further be included:

establishing and storing a mapping relationship between a text command and a control instruction.

Figure 2C:
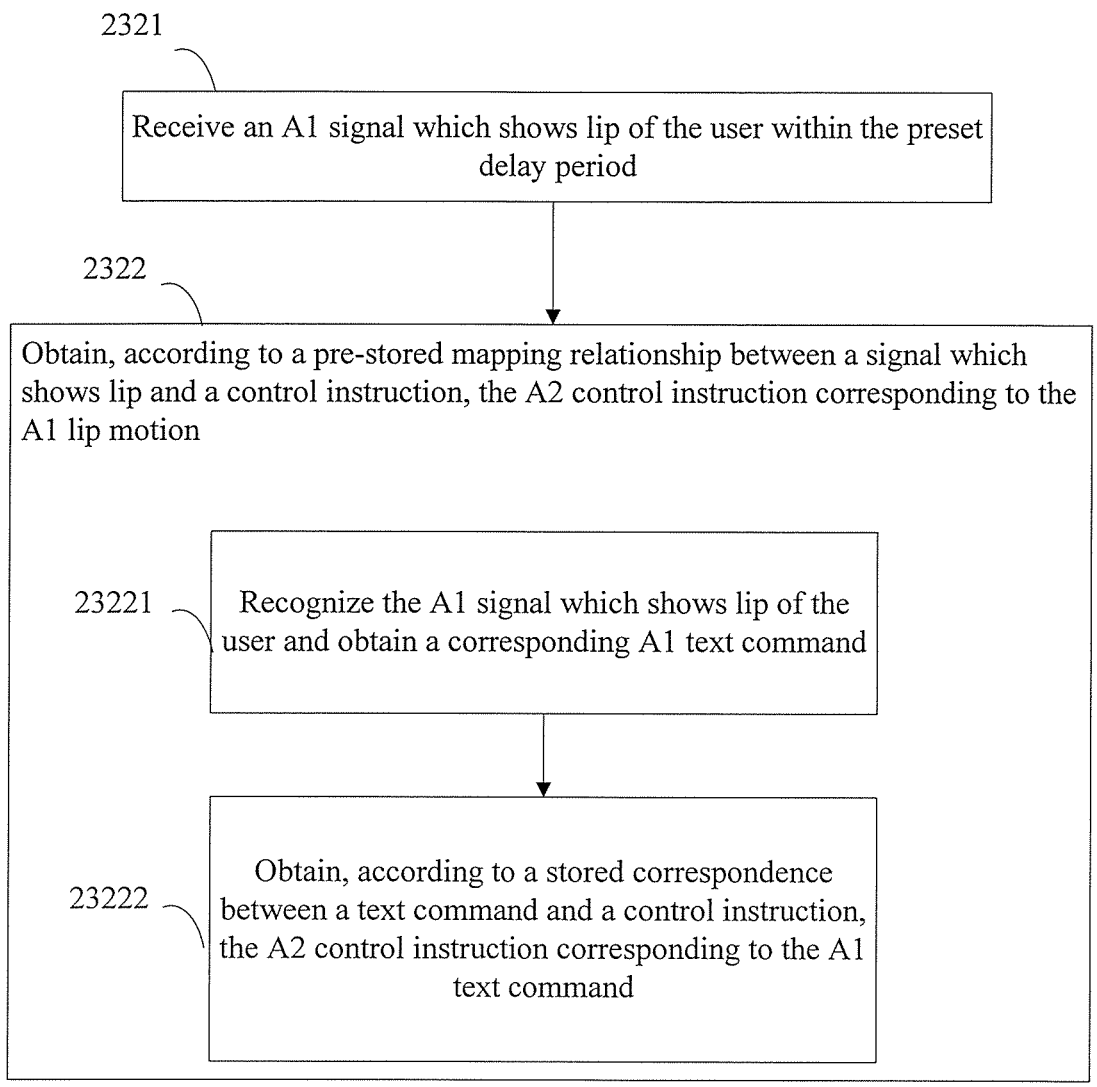

In a third implementation manner, as shown in FIG. 2c, step 23 may include:

step 2321: Receive an A1 signal which shows lip motion of the user within the preset delay period; and step 2322: Obtain, according to a pre-stored mapping relationship between a signal which shows lip motion and a control instruction, the A2 control instruction corresponding to the A1 signal which shows lip motion, where:

step 2322 may include:

step 23221: Recognize the A1 signal which shows lip motion of the user and obtain a corresponding A1 text command; and step 23222: Obtain, according to a stored correspondence between a text command and a control instruction, the A2 control instruction corresponding to the A1 text command.

Before step 23222, the following step may further be included:

establishing and storing a mapping relationship between a text command and a control instruction.

In a fourth implementation manner, step 23 may include:

step 23321: Receive an A1 brain wave signal of the user within the preset delay period; and step 23322: Obtain, according to a pre-stored mapping relationship between a brain wave signal and a control instruction, the A2 control instruction corresponding to the A1 brain wave signal.

Before step 23322, the following step may further be included:

establishing and storing the mapping relationship between a brain wave signal and a control instruction.

Before the receiving an A1 gesture motion of a user in step 21 in Embodiment of the present invention, the method may further include the following step.

Step 20: Obtain a line-of-sight focus of the user and determine an A1 controlled object, where the A1 controlled object is an operable object displayed on the electronic terminal device.

In step 22, that the electronic terminal device performs an operation corresponding to the A1 control instruction includes:

performing, by the electronic terminal device, the operation on the A1 controlled object according to the A1 control instruction.

Compared with the prior art, beneficial effects achieved in this embodiment of the present invention are as follows: By using repeated gesture motions, or combining a gesture motion and a voice recognition command, or combing a gesture motion and a lip recognition command, or combining a gesture motion and a brain wave recognition command, a user can strengthen a control instruction, and repeating a command increases an opportunity for recognizing the command; and in the present invention, a repeated command is not repeatedly executed after the command is recognized once, which prevents a controlled electronic device from performing a misoperation, thereby improving correctness and reliability of non-contact gesture control.

Figure 3:
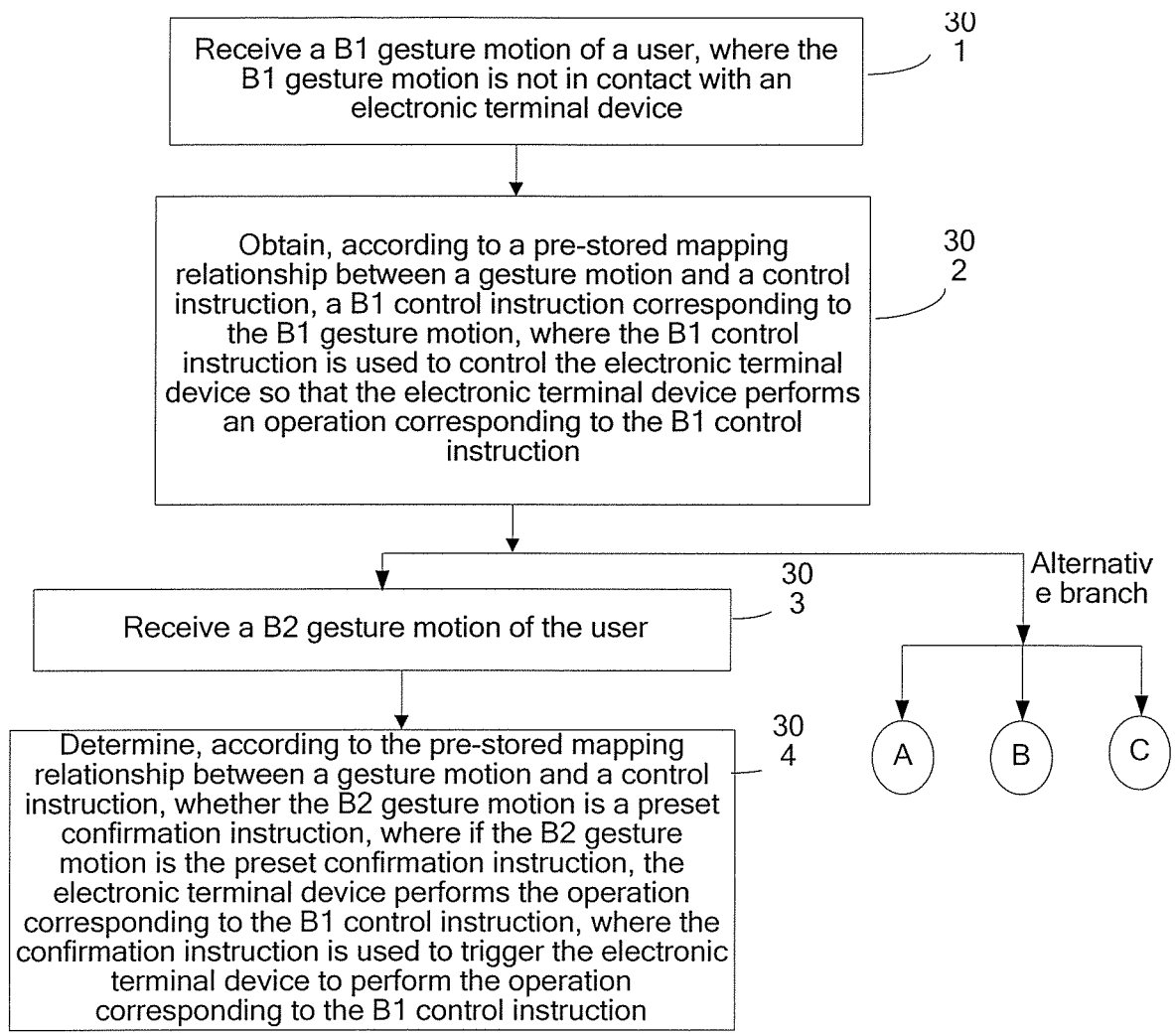
FIG. 3 is a flowchart of implementation of anon-contact gesture control method according to Embodiment 2 of the present invention.

FIG. 3 shows an implementation procedure of a non-contact gesture control method for controlling an electronic terminal device according to Embodiment 2 of the present invention, and a detailed process of the method is as follows:

Step 301: Receive a B1 gesture motion of a user, where the B1 gesture motion is not in contact with the electronic terminal device.

In this embodiment, a manner of receiving a gesture of the user is consistent with the manner of receiving a gesture of the user that is described in step 21 of Embodiment, and is not further described herein.

Step 302: Obtain, according to a pre-stored mapping relationship between a gesture motion and a control instruction, a B1 control instruction corresponding to the B1 gesture motion, where the B1 control instruction is used to control the electronic terminal device so that the electronic terminal device performs an operation corresponding to the B1 control instruction.

Step 303: Receive a B2 gesture motion of the user, where the B2 gesture motion is not in contact with the electronic terminal device.

Step 304: Determine, according to the pre-stored mapping relationship between a gesture motion and a control instruction, whether the B2 gesture motion is a preset confirmation instruction, where if the B2 gesture motion is the preset confirmation instruction, the electronic terminal device performs the operation corresponding to the B1 control instruction, where the confirmation instruction is used to trigger the electronic terminal device to perform the operation corresponding to the B1 control instruction.

Figure 3A:
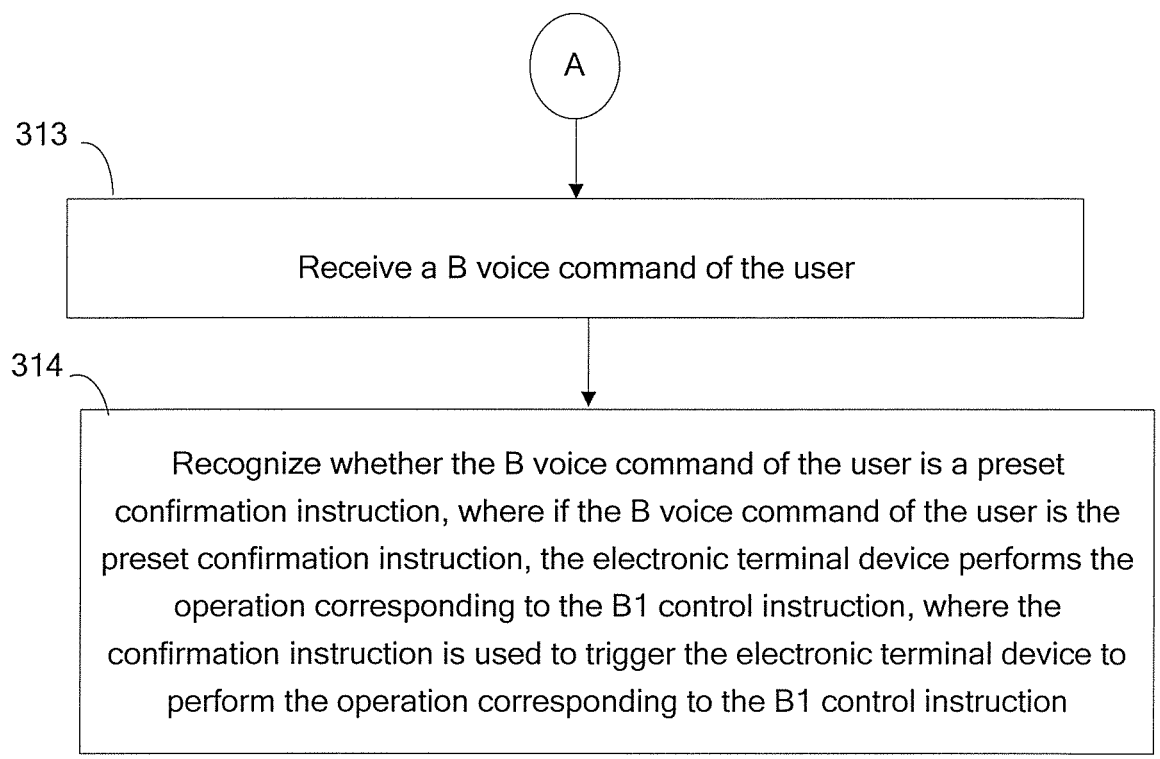
FIG. 3a, FIG. 3b, and FIG. 3c are sub-flowcharts of three alternative branches of the non-contact gesture control method according to Embodiment 2 of the present invention.

In this embodiment, step 303 and step 304 may also have the following alternative implementation steps:

Alternative implementation manner 1 is shown in FIG. 3a.

Step 313: Receive a B voice command of the user.

Step 314: Recognize whether the B voice command of the user is a preset confirmation instruction, where if the B voice command of the user is the preset confirmation instruction, the electronic terminal device performs the operation corresponding to the B1 control instruction, where the confirmation instruction is used to trigger the electronic terminal device to perform the operation corresponding to the B1 control instruction.

In this step, first, the B voice command may be recognized to obtain a corresponding B text command, and then whether the B text command is a confirmation instruction is determined according to a stored correspondence between a text command and a control instruction.

Figure 3B:
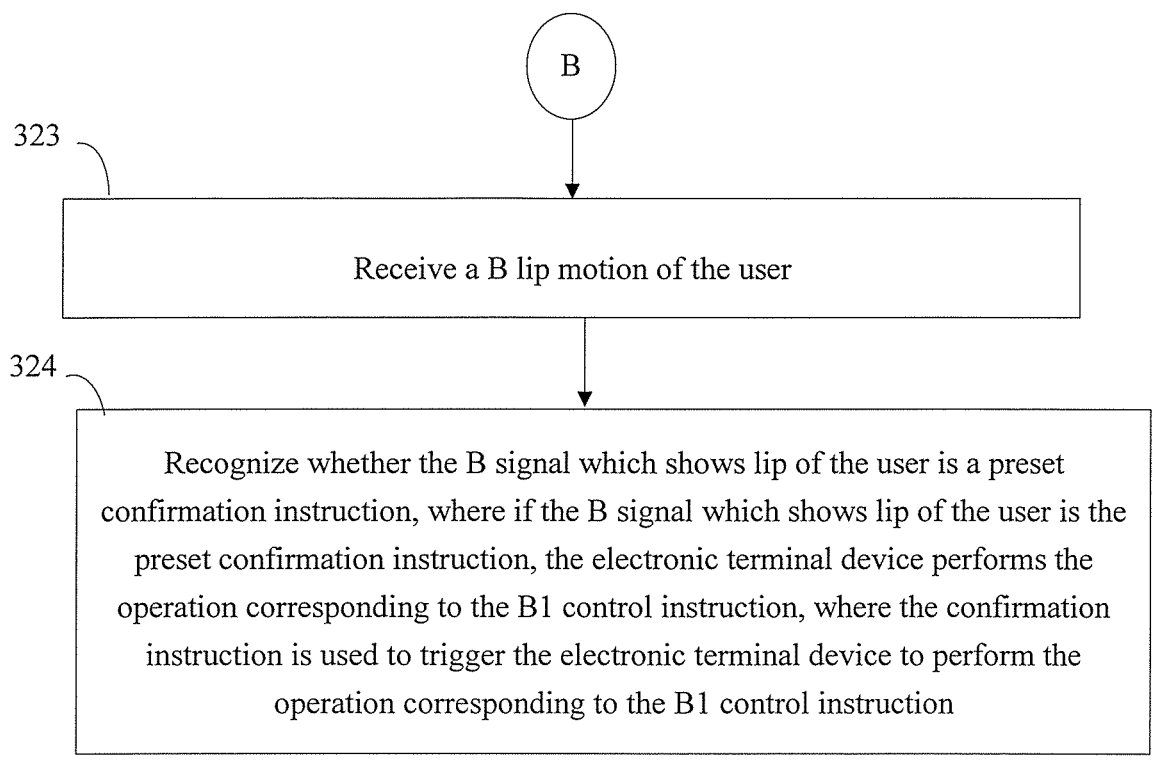

Alternative implementation manner 2 is shown in FIG. 3b.

Step 323: Receive a B signal which shows lip motion of the user.

Step 324: Recognize whether the B signal which shows lip motion of the user is a preset confirmation instruction, where if the B signal which shows lip motion of the user is the preset confirmation instruction, the electronic terminal device performs the operation corresponding to the B1 control instruction, where the confirmation instruction is used to trigger the electronic terminal device to perform the operation corresponding to the B1 control instruction.

In this step, first, the B signal which shows lip motion of the user may be recognized to obtain a corresponding B1 text command, and then whether the B1 text command is a confirmation instruction is determined according to a stored correspondence between a text command and a control instruction.

Figure 3C:
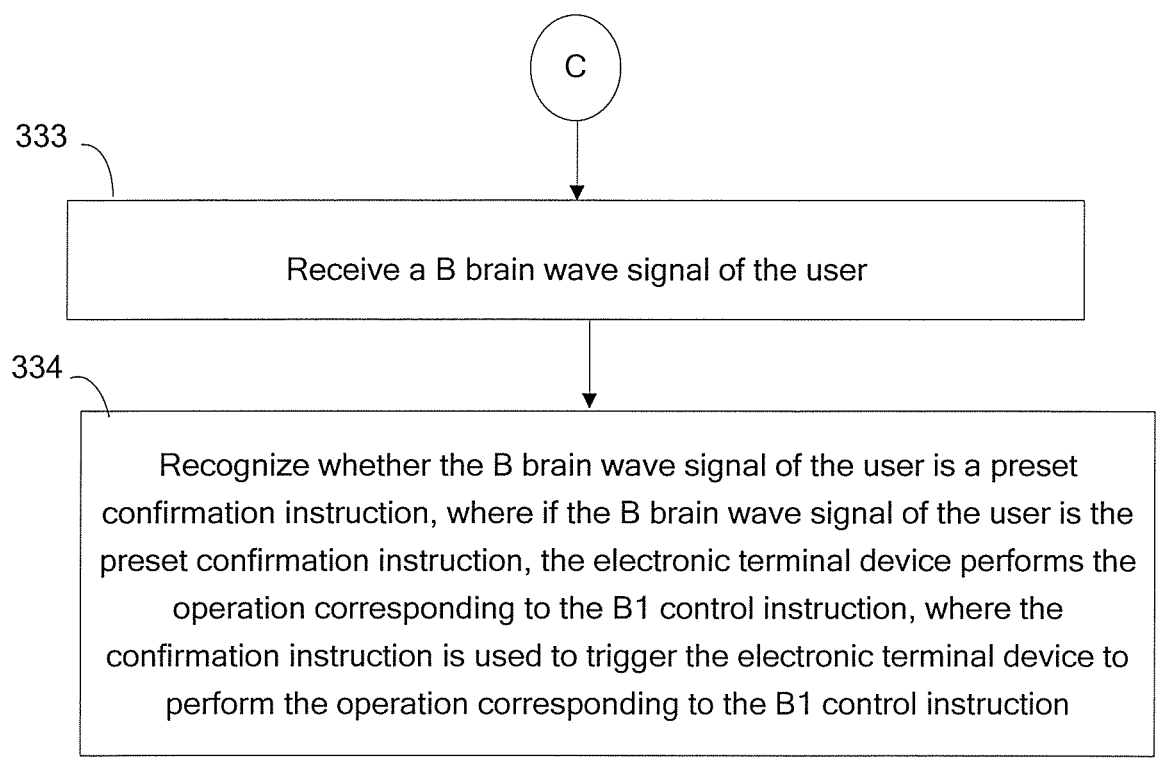

Alternative implementation manner 3 is shown in FIG. 3c.

Step 333: Receive a B brain wave signal of the user.

Step 334: Recognize whether the B brain wave signal of the user is a preset confirmation instruction, where if the B brain wave signal of the user is the preset confirmation instruction, the electronic terminal device performs the operation corresponding to the E1 control instruction, where the confirmation instruction is used to trigger the electronic terminal device to perform the operation corresponding to the B1 control instruction.

Beneficial effects in this embodiment of the present invention are as follows: Confirming a command of non-contact gesture control for a second time improves correctness and reliability of the non-contact gesture control.

Figure 4:
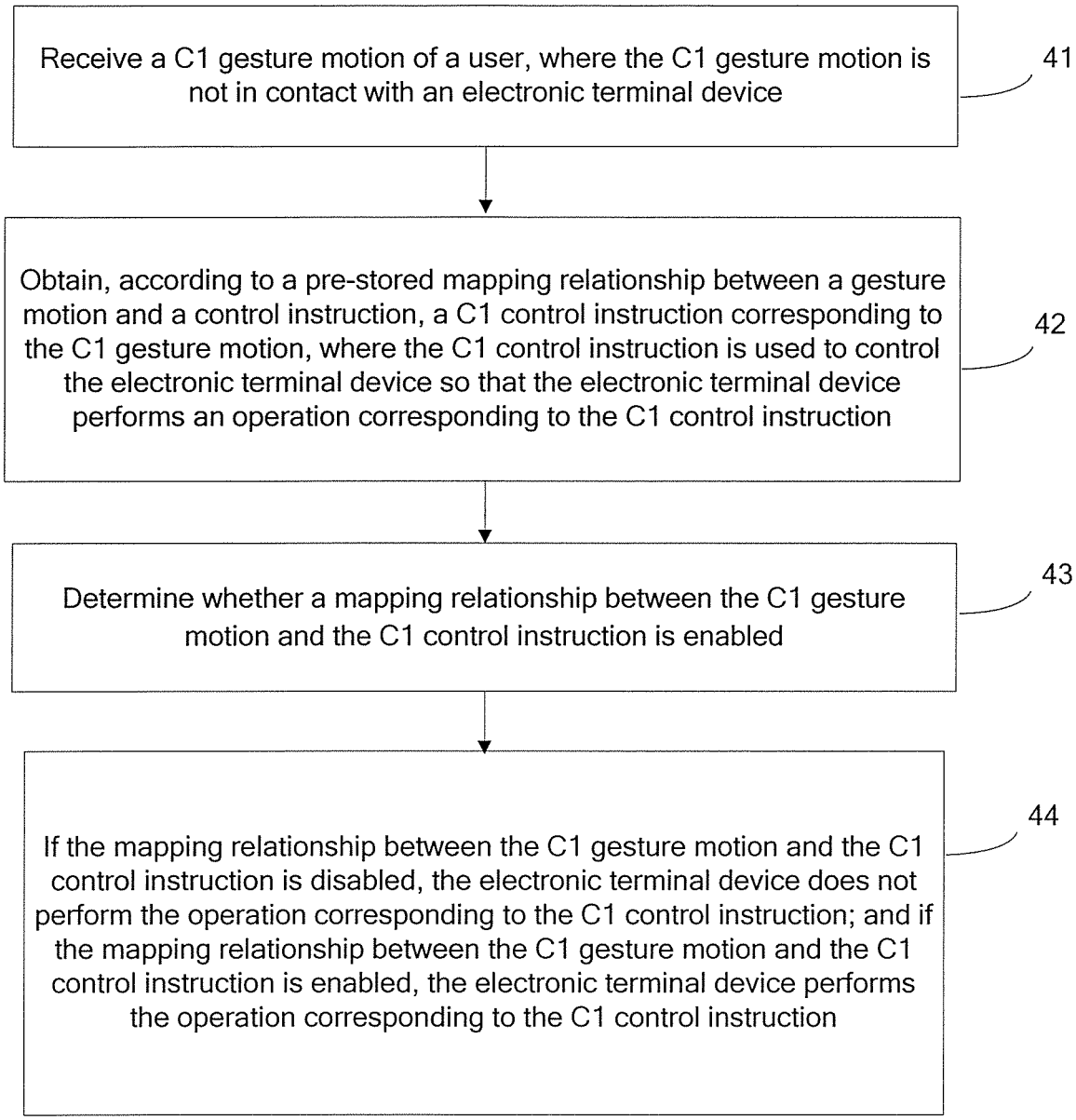
FIG. 4 is a flowchart of implementation of anon-contact gesture control method according to Embodiment 3 of the present invention.

FIG. 4 shows an implementation procedure of a non-contact gesture control method for controlling an electronic terminal device according to Embodiment of the present invention, and a detailed process of the method is as follows:

Step 41: Receive a C1 gesture motion of a user, where the C1 gesture motion is not in contact with the electronic terminal device.

Step 42: Obtain, according to a pre-stored mapping relationship between a gesture motion and a control instruction, a C1 control instruction corresponding to the C1 gesture motion, where the C1 control instruction is used to control the electronic terminal device so that the electronic terminal device performs an operation corresponding to the C1 control instruction.

Step 43: Determine whether a mapping relationship between the C1 gesture motion and the C1 control instruction is enabled.

Step 44: If the mapping relationship between the C1 gesture motion and the C1 control instruction is disabled, the electronic terminal device does not perform the operation corresponding to the C1 control instruction; and if the mapping relationship between the C1 gesture motion and the C1 control instruction is enabled, the electronic terminal device performs the operation corresponding to the C1 control instruction.

Beneficial effects in this embodiment of the present invention are as follows: A correspondence between a command of non-contact gesture control and a gesture motion may be set to enabled or disabled, so that a non-contact gesture motion with a high misrecognition rate can be disabled, thereby improving correctness and reliability of the non-contact gesture control.

Figure 5:
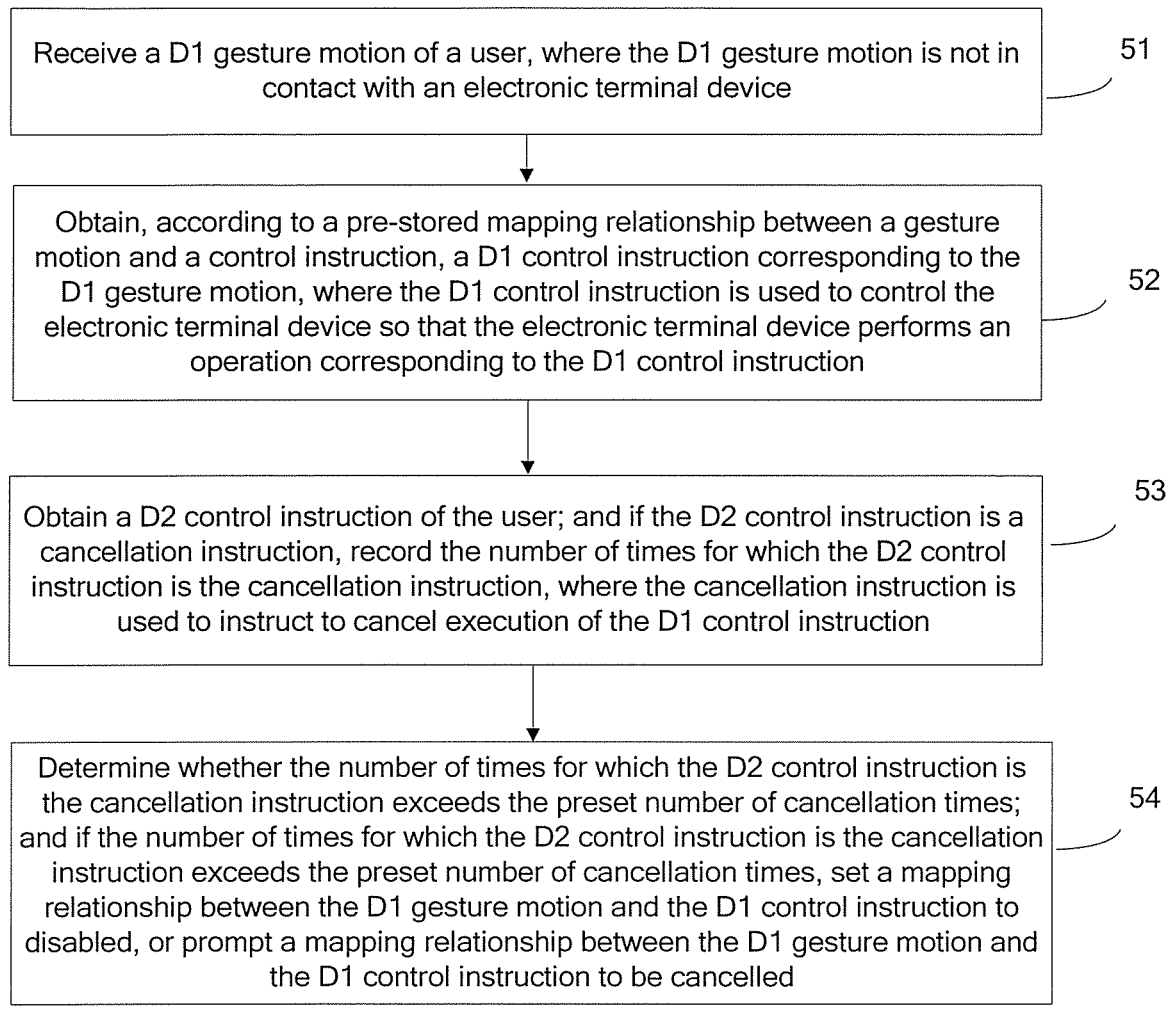
FIG. 5 is a flowchart of implementation of anon-contact gesture control method according to Embodiment 4 of the present invention.

FIG. 5 shows an implementation procedure of a non-contact gesture control method for controlling an electronic terminal device according to Embodiment of the present invention, and a detailed process of the method is as follows:

Step 51: Receive a D1 gesture motion of a user, where the D1 gesture motion is not in contact with the electronic terminal device.

Step 52: Obtain, according to a pre-stored mapping relationship between a gesture motion and a control instruction, a D1 control instruction corresponding to the D1 gesture motion, where the D1 control instruction is used to control the electronic terminal device so that the electronic terminal device performs an operation corresponding to the D1 control instruction.

Step 53: Obtain a D2 control instruction of the user; and if the D2 control instruction is a cancellation instruction, record the number of times for which the D2 control instruction is the cancellation instruction, where the cancellation instruction is used to instruct to cancel execution of the D1 control instruction.

Step 54: Determine whether the number of times for which the D2 control instruction is the cancellation instruction exceeds the preset number of cancellation times; and if the number of times for which the D2 control instruction is the cancellation instruction exceeds the preset number of cancellation times, set a mapping relationship between the D1 gesture motion and the D1 control instruction to disabled, or prompt a mapping relationship between the D1 gesture motion and the D1 control instruction to be cancelled.

The obtaining a D2 control instruction of the user in step 53 in this embodiment may use the following four implementation manners.

Figure 5A:
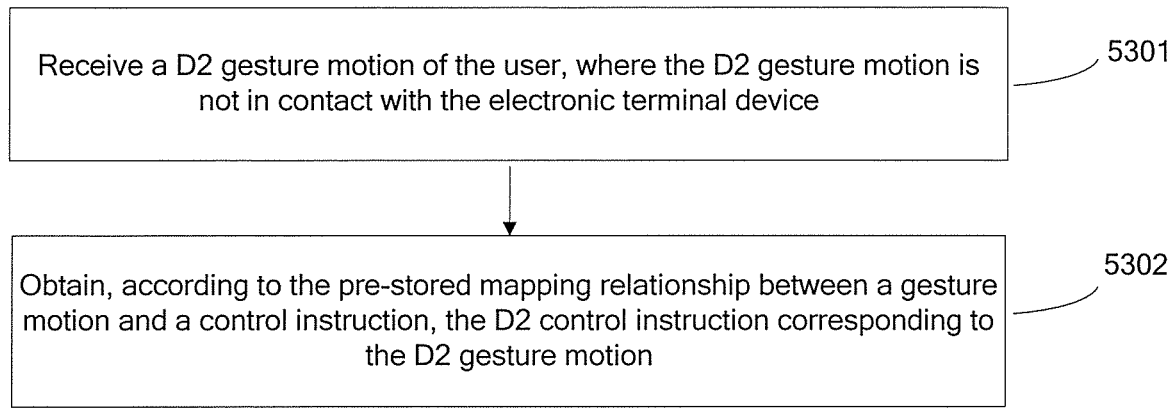
FIG. 5a, FIG. 5b, FIG. 5c, and FIG. 5d are detailed flowcharts of obtaining a D2 control instruction according to Embodiment 4.

Manner 1 is shown in FIG. 5a:

step 5301: Receive a D2 gesture motion of the user, where the D2 gesture motion is not in contact with the electronic terminal device; and step 5302: Obtain, according to the pre-stored mapping relationship between a gesture motion and a control instruction, the D2 control instruction corresponding to the D2 gesture motion.

Figure 5B:
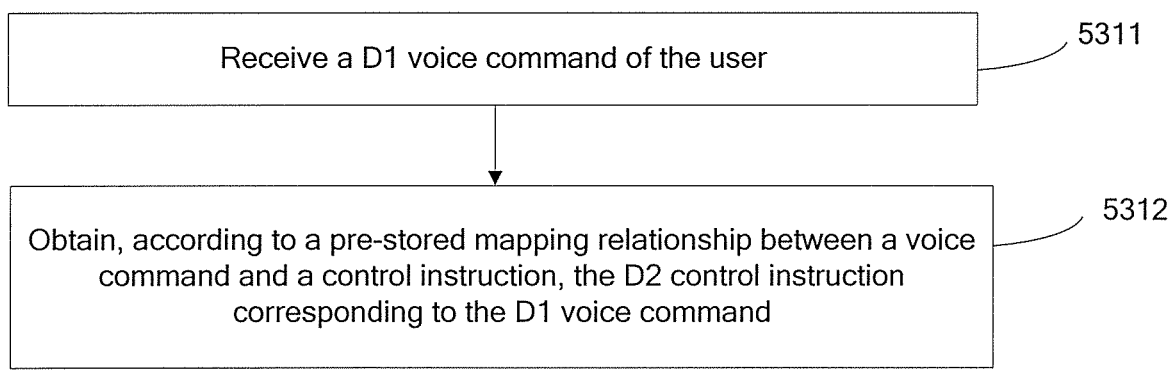

Manner 2 is shown in FIG. 5b:

step 5311: Receive a D1 voice command of the user; and step 5312: Obtain, according to a pre-stored mapping relationship between a voice command and a control instruction, the D2 control instruction corresponding to the D1 voice command.

Figure 5C:
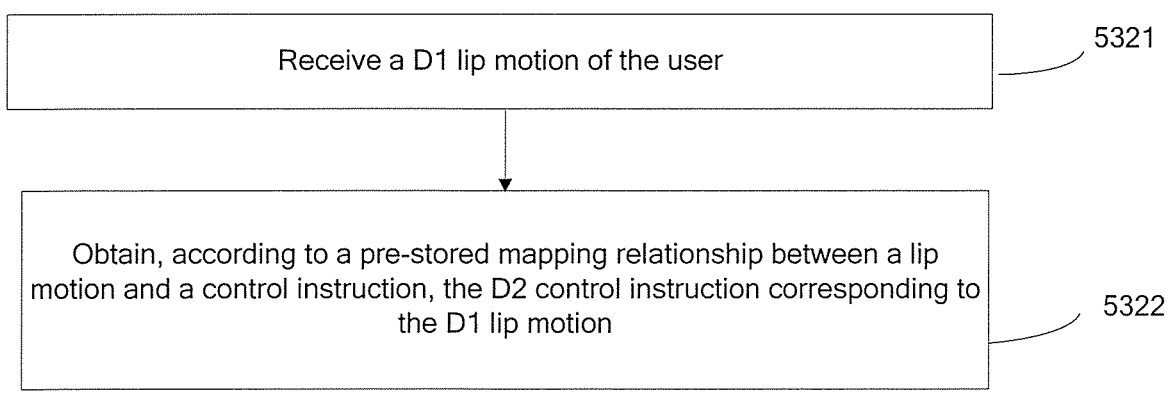

Manner 3 is shown in FIG. 5c:

step 5321: Receive a D1 signal which shows lip motion of the user; and step 5322: Obtain, according to a pre-stored mapping relationship between a signal which shows lip motion and a control instruction, the D2 control instruction corresponding to the D1 signal which shows lip motion.

Figure 5D:
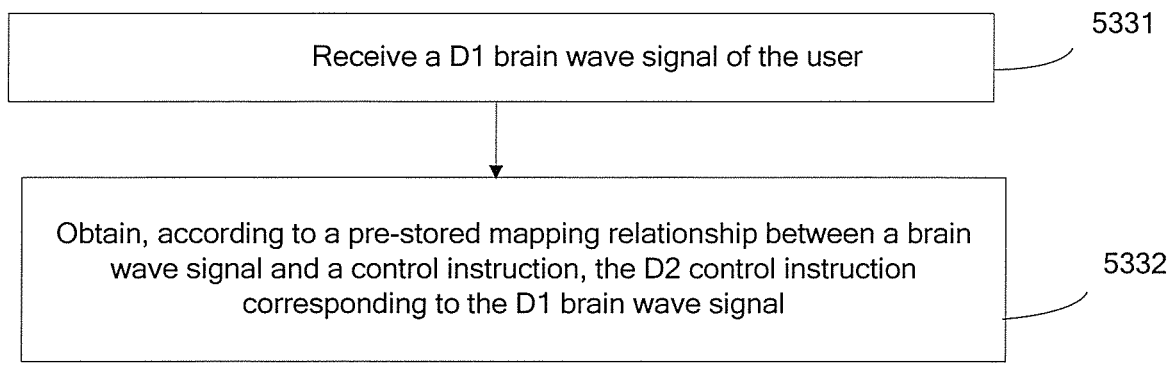

Manner 4 is shown in FIG. 5d:

step 5331: Receive a D1 brain wave signal of the user; and step 5332: Obtain, according to a pre-stored mapping relationship between a brain wave signal and a control instruction, the D2 control instruction corresponding to the D1 brain wave signal.

Beneficial effects in this embodiment of the present invention are as follows: By determining the number of times for which a gesture motion of non-contact gesture control is cancelled, a gesture motion that causes multiple misoperations is adjusted to improve recognition accuracy of a non-contact gesture control instruction, thereby improving control correctness and reliability.

Figure 6:
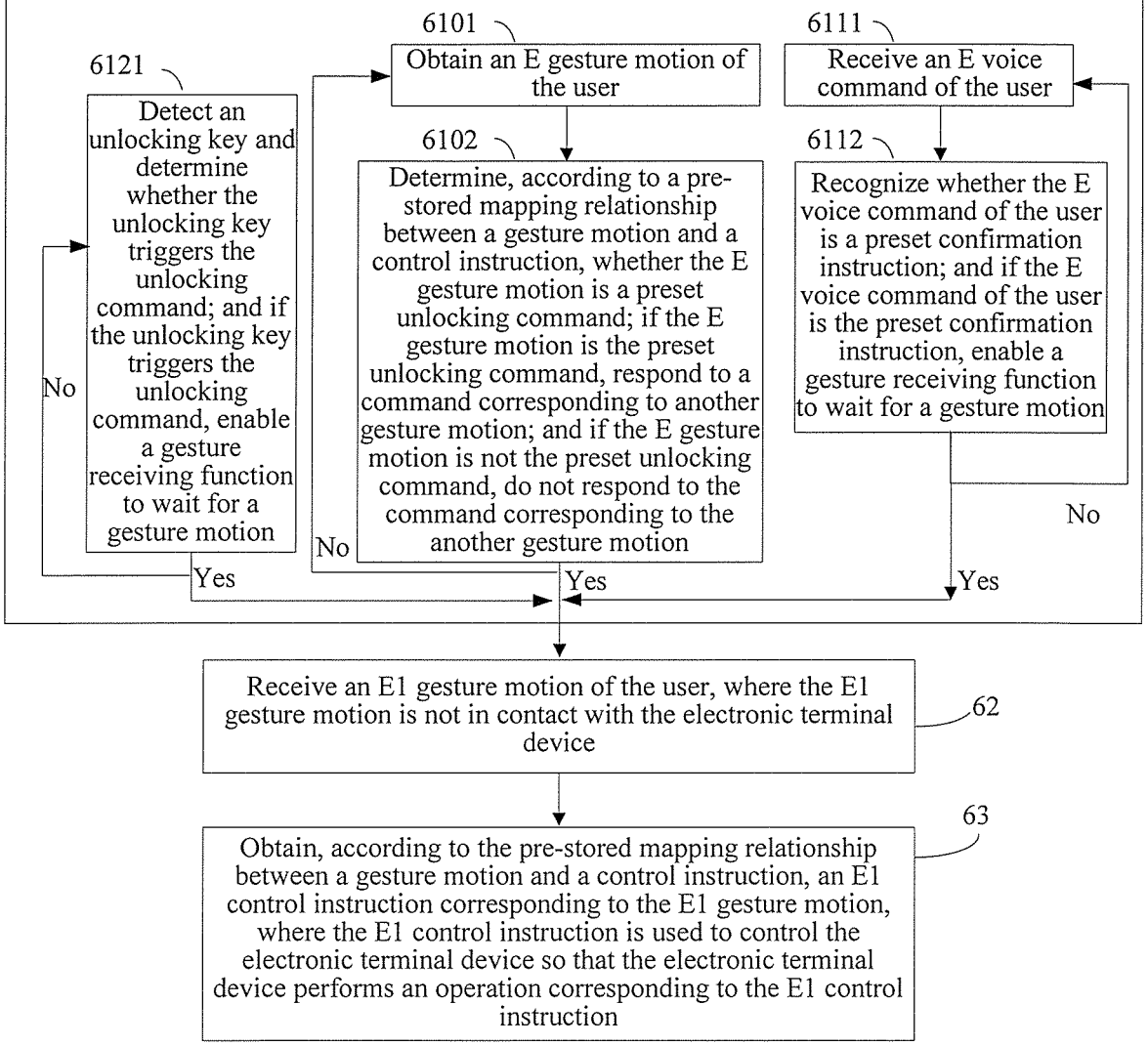
FIG. 6 is a flowchart of implementation of a non-contact gesture control method according to Embodiment 5 of the present invention.

FIG. 6 shows an implementation procedure of a non-contact gesture control method for controlling an electronic terminal device according to Embodiment of the present invention, and a detailed process of the method is as follows:

Step 61: Receive an unlocking command of a user, where the electronic terminal device executes the unlocking command so as to terminate a locking state and enter a state in which a non-contact gesture motion can be received.

Step 62: Receive an E1 gesture motion of the user, where the E1 gesture motion is not in contact with the electronic terminal device.

Step 63: Obtain, according to a pre-stored mapping relationship between a gesture motion and a control instruction, an E1 control instruction corresponding to the E1 gesture motion, where the E1 control instruction is used to control the electronic terminal device so that the electronic terminal device performs an operation corresponding to the E1 control instruction.

Step 61 may have the following four manners of detailed steps.

Manner 1: Step 61 includes the following steps:

step 6101: Receive an E gesture motion of the user; and step 6102: Determine, according to the pre-stored mapping relationship between a gesture motion and a control instruction, whether the E gesture motion is a preset unlocking command; if the E gesture motion is the preset unlocking command, respond to a command corresponding to another gesture motion and perform step 62; and if the E gesture motion is not the preset unlocking command, do not respond to the command corresponding to the another gesture motion, and cyclically perform step 6101 and step 6102 and wait for an unlocking command.

Manner 2: Step 61 includes the following steps:

step 6111: Receive an E voice command of the user; and step 6112: Recognize whether the E voice command of the user is a preset unlocking command; if the E voice command of the user is the preset unlocking command, enable a gesture receiving function to wait for a gesture motion, and perform step 62; and if the E voice command of the user is not the preset unlocking command, cyclically perform step 6111 and step 6112 and wait for an unlocking command.

Manner 3: Step 61 includes:

step 6121: Detect an unlocking key and determine whether the unlocking key triggers the unlocking command; if the unlocking key triggers the unlocking command, enable a gesture receiving function to wait for a gesture motion, and perform 62; and if the unlocking key does not trigger the unlocking command, repeatedly perform step 6121 and wait for an unlocking command.

Beneficial effects in this embodiment of the present invention are as follows: Locking and unlocking of non-contact gesture control are controlled to prevent a non-contact gesture control apparatus from generating a misoperation control instruction when the apparatus is controlled by an unintentional non-contact gesture of a user, which improves control correctness and reliability.

Figure 7:
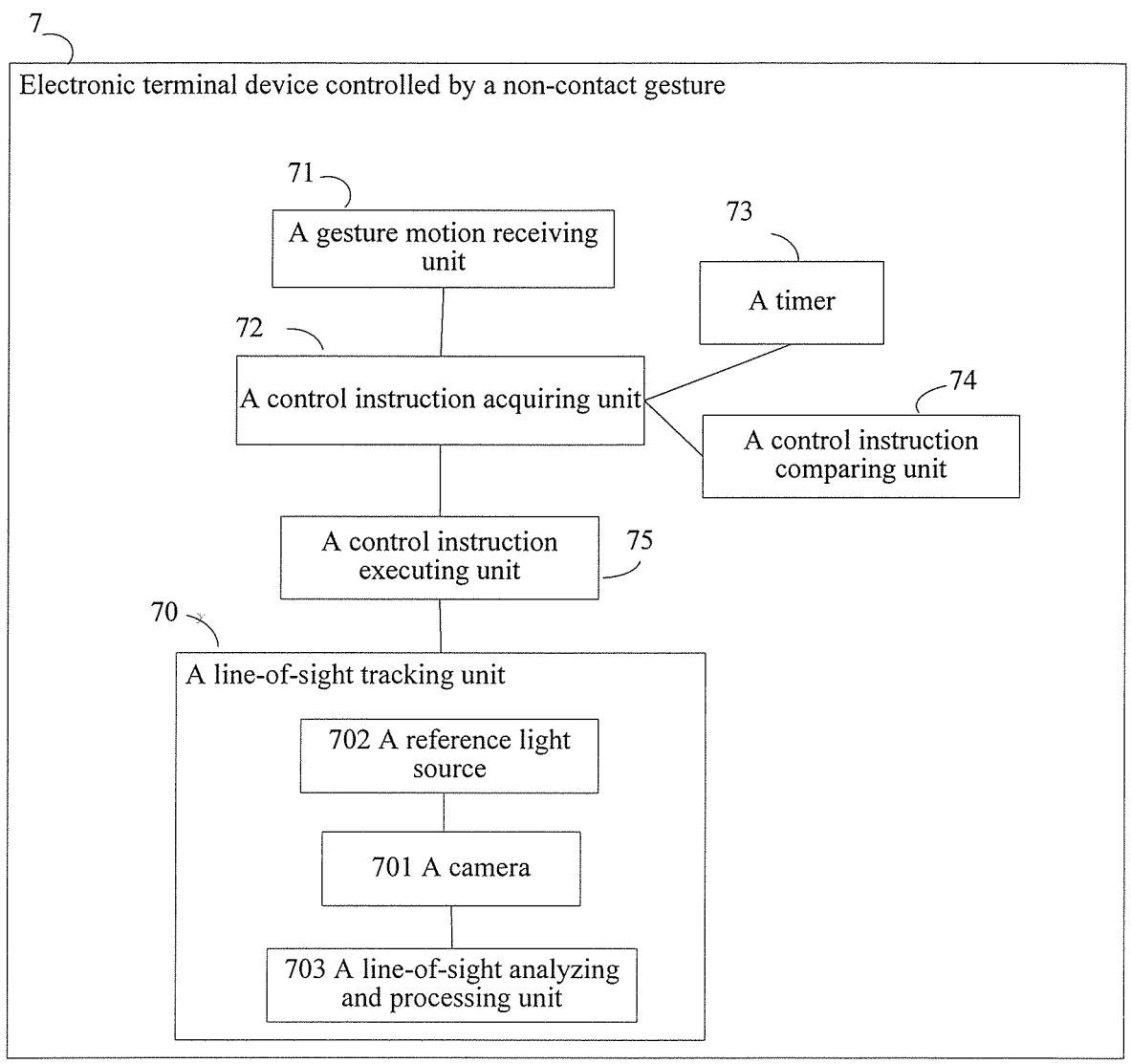
FIG. 7 is a function block diagram of an electronic terminal device controlled by a non-contact gesture according to Embodiment 6 of the present invention.

FIG. 7 shows a composition block diagram of function modules of an electronic terminal device controlled by a non-contact gesture according to Embodiment of the present invention, and for ease of description, only a part related to this embodiment of the present invention is shown. The electronic terminal device controlled by a non-contact gesture may be a cell phone, a gesture game terminal, a desktop computer, a tablet computer, a television, a refrigerator, a washing machine, an air-conditioner, a digital camera, a surveillance camera, a medical electronic instrument, and the like; and a function unit of the electronic terminal device controlled by a non-contact gesture may be a software unit, a hardware unit, or a software and hardware combined unit.

The electronic terminal device 7 controlled by a non-contact gesture includes an A gesture motion receiving unit 71, an A control instruction acquiring unit 72, an A timer 73, an A control instruction comparing unit 74, and an A control instruction executing unit 75, and a specific function of each unit is as follows:

The A gesture motion receiving unit 71 is configured to receive an A1 gesture motion of a user and an A2 gesture motion after the A1 gesture motion, where the A1 gesture motion and the A2 gesture motion are not in contact with the electronic terminal device; and preferably, the A gesture motion receiving unit 71 may include an image collector, an infrared transmitter, and an image analyzing unit, where the image collector is configured to collect a gesture image of a human body; the infrared transmitter is configured to send an infrared ray to an area where the human body reaches; and the image analyzing unit is configured to analyze the gesture image collected by the image collector, so as to obtain a gesture motion. The A gesture motion receiving unit 71 may also include an ultrasonic transmitter, an ultrasonic receiving unit, and an ultrasonic analyzing unit, where the ultrasonic transmitter is configured to transmit an ultrasonic wave to a gesture control area; the ultrasonic receiving unit is configured to receive an ultrasonic wave that is transmitted by the ultrasonic transmitter and is reflected by a gesture motion; and the ultrasonic analyzing unit is configured to analyze the reflected ultrasonic wave received by the ultrasonic receiving unit, so as to obtain the gesture motion.

The A control instruction acquiring unit 72 is configured to obtain, according a pre-stored mapping relationship between a gesture motion and a control instruction, an A1 control instruction corresponding to the A1 gesture motion that is received by the A gesture motion receiving unit 71 and an A2 control instruction corresponding to the A2 gesture motion that is received by the A gesture motion receiving unit 71, where the A1 control instruction and the A2 control instruction are used to control the electronic terminal device 7.

The A timer 73 is configured to record a time interval between obtaining the A1 control instruction by the A control instruction acquiring unit 72 and obtaining the A2 control instruction by the A control instruction acquiring unit 72, or is configured to record a time interval between receiving the A1 gesture motion by the A gesture motion receiving unit 71 and receiving the A2 gesture motion by the A gesture motion receiving unit 71.

The A control instruction comparing unit 74 is configured to: when the time interval recorded by the A timer 73 is less than preset time, compare the A2 control instruction with the A1 control instruction, and determine whether the A2 control instruction is consistent with the A1 control instruction, where the preset time is less than three seconds.

The A control instruction executing unit 75 is configured to: perform an operation corresponding to the A1 control instruction; when a comparing result of the A control instruction comparing unit 74 is that the A2 control instruction is consistent with the A1 control instruction, skip performing an operation corresponding to the A2 control instruction; and when the comparing result of the A control instruction comparing unit 74 is that the A2 control instruction is inconsistent with the A1 control instruction, perform the operation corresponding to the A2 control instruction.

The electronic terminal device 7 controlled by a non-contact gesture according to this embodiment of the present invention may further include an A line-of-sight tracking unit 70, configured to track a line of sight of the user to obtain an A controlled object that is focused by the user, where the A controlled object is an operable object displayed on the electronic terminal device.

The A control instruction executing unit 75 is further configured to perform, on the A controlled object, the operation corresponding to the A1 control instruction; when the comparing result of the A control instruction comparing unit 74 is that the A2 control instruction is consistent with the A1 control instruction, skip performing, on the A controlled object, the operation corresponding to the A2 control instruction; and when the comparing result of the A control instruction comparing unit 74 is that the A2 control instruction is inconsistent with the A1 control instruction, perform, on the A controlled object, the operation corresponding to the A2 control instruction.

The A line-of-sight tracking unit 70 may include an A camera 701, an A reference light source 702, and an A line-of-sight analyzing and processing unit 703. The A camera 701 photographs a pupil image of the user, the A reference light source 702 transmits a light source to pupils of the user to form multiple reference light spots, and the A line-of-sight analyzing and processing unit 703 analyzes multiple pupil images photographed by the A camera 701, determines a position deviation relationship between a pupil and projection of a reference light spot to obtain a focus of the user on the electronic terminal device 7 and obtain an A1 controlled object focused by the user.

Compared with the prior art, beneficial effects achieved in this embodiment of the present invention are as follows: A user can repeat a command by using repeated gesture motions to strengthen a command expected to be executed; a system recognizes that multiple repeated commands from the user emphasize only one command, and does not execute the command repeatedly, which avoids a misoperation caused by multiple repeated gestures of the user, thereby improving correctness and reliability of non-contact gesture control.

Figure 8:
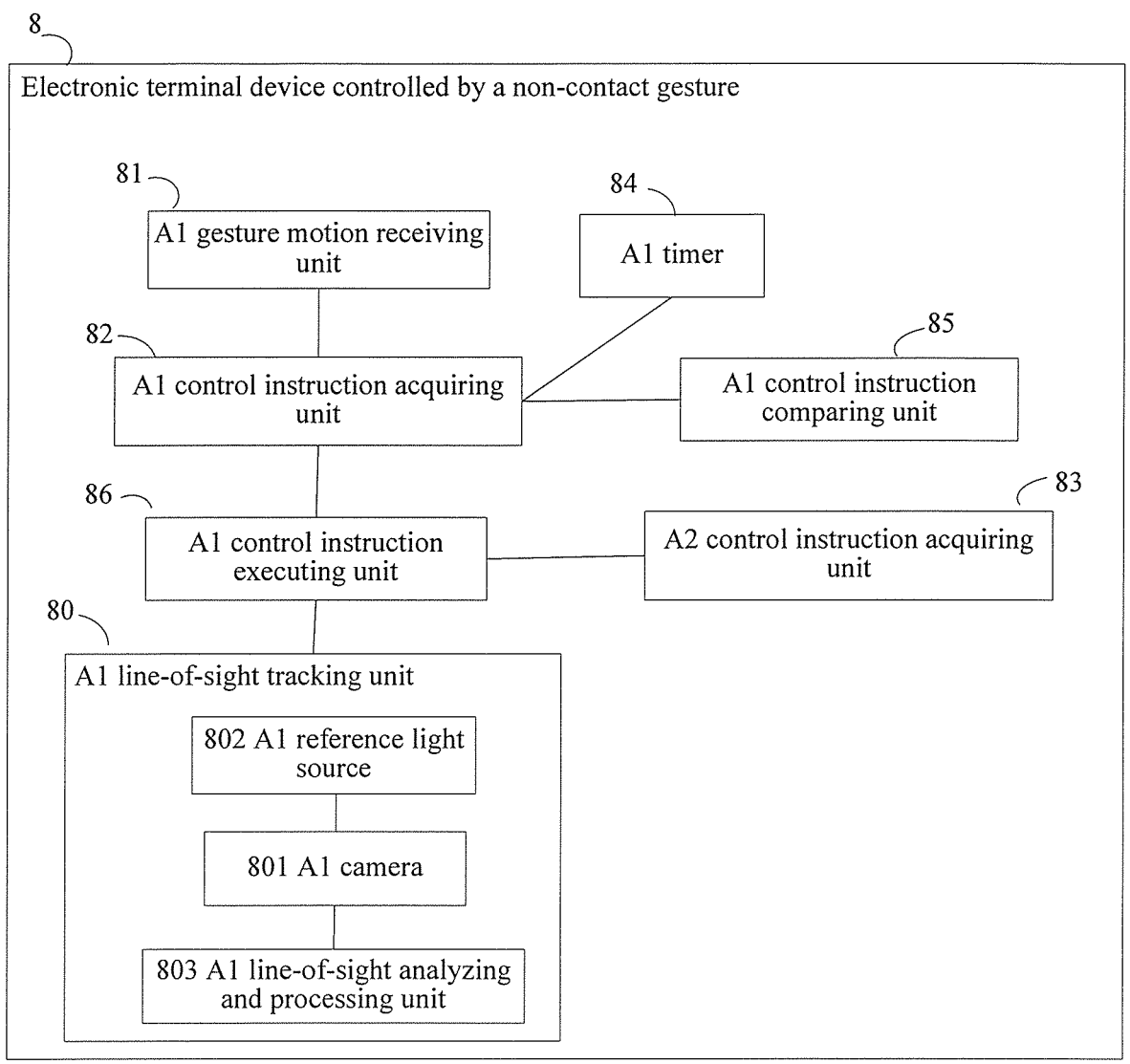
FIG. 8 is a function block diagram of an electronic terminal device controlled by a non-contact gesture according to Embodiment 7 of the present invention.

FIG. 8 shows a composition block diagram of function modules of an electronic terminal device controlled by a non-contact gesture according to Embodiment of the present invention, and for ease of description, only a part related to this embodiment of the present invention is shown. The electronic terminal device 8 includes: an A1 gesture motion receiving unit 81, an A1 control instruction acquiring unit 82, an A2 control instruction acquiring unit 83, an A1 timer 84, an A1 control instruction comparing unit 85, and an A1 control instruction executing unit 86, and a specific function of each unit is as follows:

The A1 gesture motion receiving unit 81 is configured to receive an A1 gesture motion of a user, where the A1 gesture motion is not in contact with the electronic terminal device 8; and composition and implementation manners of the A1 gesture motion receiving unit 81 are the same as those of the A gesture motion receiving unit 71 in Embodiment in the foregoing, and are not further described herein.

The A1 control instruction acquiring unit 82 is configured to obtain, according to a pre-stored mapping relationship between a gesture motion and a control instruction, an A1 control instruction corresponding to the A1 gesture motion that is received by the A1 gesture motion receiving unit 81, where the A1 control instruction is used to control the electronic terminal device 8.

The A2 control instruction acquiring unit 83 is configured to obtain an A2 control instruction, where the A2 control instruction is used to control the electronic terminal device 8.

The A1 timer 84 is configured to record a time interval between obtaining the A1 control instruction by the A1 control instruction acquiring unit 82 and obtaining the A2 control instruction by the A2 control instruction acquiring unit 83.

The A1 control instruction comparing unit 85 is configured to: when the time interval recorded by the A1 timer 84 is less than preset time, compare the A1 control instruction with the A2 control instruction, and determine whether the A1 control instruction is consistent with the A2 control instruction, where the preset time is less than three seconds.

The A1 control instruction executing unit 86 is configured to: perform an operation corresponding to the A1 control instruction; when a comparing result of the A1 control instruction comparing unit 85 is that the A1 control instruction is consistent with the A2 control instruction, skip performing an operation corresponding to the A2 control instruction; and when the comparing result of the A1 control instruction comparing unit 85 is that the A1 control instruction is inconsistent with the A2 control instruction, perform the operation corresponding to the A2 control instruction.

Figure 8A:
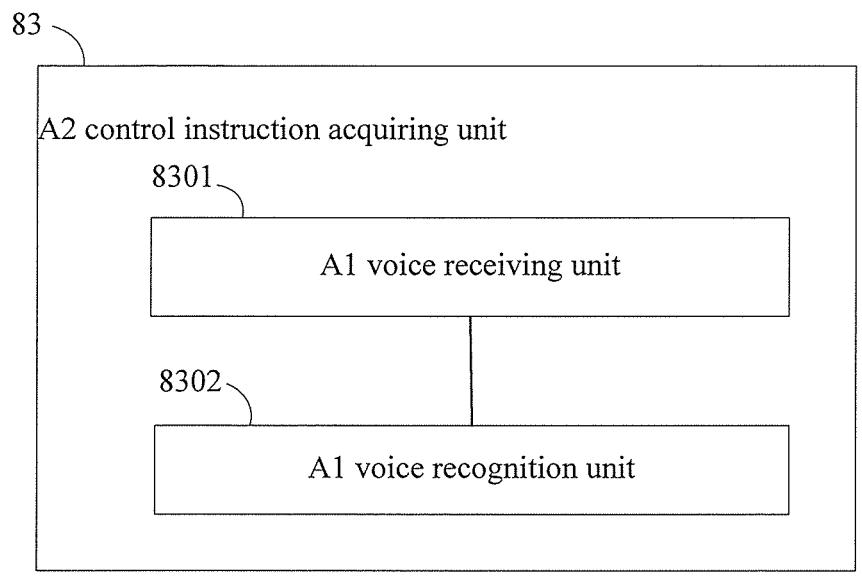
FIG. 8a, FIG. 8b, and FIG. 8c are composition block diagrams of three manner sub-functions of an A2 control instruction acquiring unit according to Embodiment 7.

In Embodiment of the present invention, further, as shown in FIG. 8*a*, the A2 control instruction acquiring unit 83 may include: an A1 voice receiving unit 8301 and an A1 voice recognition unit 8302, where:

the A1 voice receiving unit 8301, for example a microphone, is configured to receive an A1 voice command of the user; and the A1 voice recognition unit 8302 is configured to recognize the A1 voice command received by the A1 voice receiving unit; and obtain the A2 control instruction corresponding to the A1 voice command.

Figure 8B:
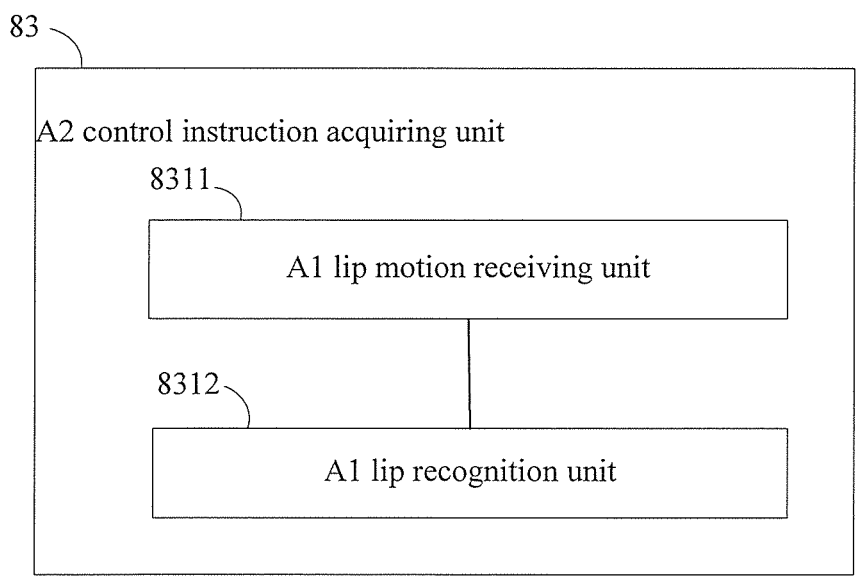

Alternative manner 1: As shown in FIG. 8b, the A2 control instruction acquiring unit 83 may include: an A1 signal which shows lip motion receiving unit 8311 and an A1 lip recognition unit 8312, where:

the A1 signal which shows lip motion receiving unit 8311 is configured to receive an A1 signal which shows lip motion of the user; and the A1 lip recognition unit 8312 is configured to recognize the A1 signal which shows lip motion received by the A1 signal which shows lip motion receiving unit 8311; and obtain the A2 control instruction corresponding to the A1 signal which shows lip motion.

Figure 8C:
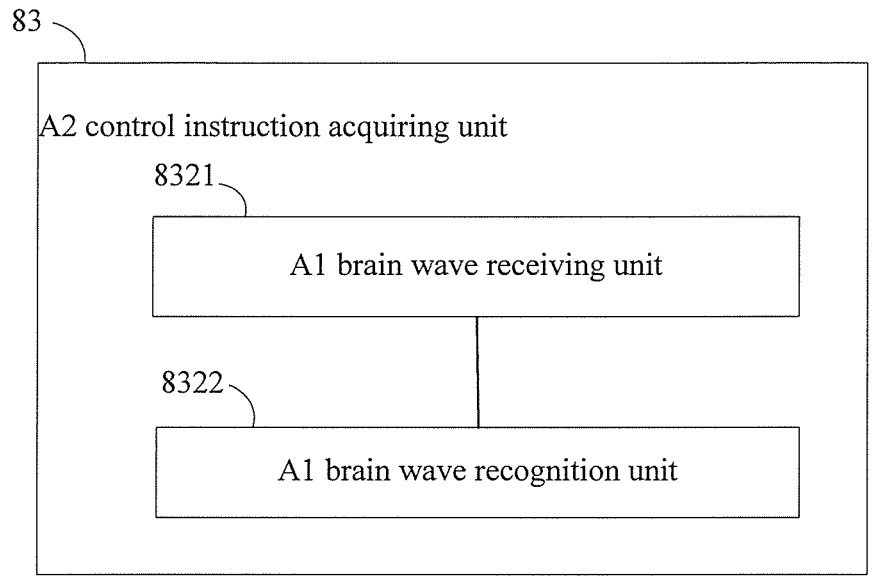

Alternative manner 2: As shown in FIG. 8c, the A2 control instruction acquiring unit 83 may include: an A1 brain wave receiving unit 8321 and an A1 brain wave recognition unit 8322, where:

the A1 brain wave receiving unit 8321 is configured to receive an A1 brain wave signal of the user; and the A1 brain wave recognition unit 8322 is configured to recognize the A1 brainwave signal received by the A1 brainwave receiving unit 8321; and obtain the A2 control instruction corresponding to the A1 brain wave signal.

The electronic terminal device 8 controlled by a non-contact gesture according to this embodiment of the present invention may further include an A1 line-of-sight tracking unit 80, configured to track a line of sight of the user to obtain an A1 controlled object that is focused by the user, where the A1 controlled object is an operable object displayed on the electronic terminal device.

The A1 control instruction executing unit 86 is further configured to perform, on the A1 controlled object, the operation corresponding to the A1 control instruction; when the comparing result of the A1 control instruction comparing unit 85 is that the A1 control instruction is consistent with the A2 control instruction, skip performing, on the A1 controlled object, the operation corresponding to the A2 control instruction; and when the comparing result of the A1 control instruction comparing unit 85 is that the A1 control instruction is inconsistent with the A2 control instruction, perform, on the A1 controlled object, the operation corresponding to the A2 control instruction.

The A1 line-of-sight tracking unit 80 may include an A1 camera 801, an A1 reference light source 802, and an A1 line-of-sight analyzing and processing unit 803. The A1 camera 801 photographs a pupil image of the user, the A1 reference light source 802 transmits a light source to pupils of the user to form multiple reference light spots, and the A1 line-of-sight analyzing and processing unit 803 analyzes multiple pupil images photographed by the A1 camera 801, determines a position deviation relationship between a pupil and projection of a reference light spot to obtain a focus of the user on the electronic terminal device and obtain the A1 controlled object focused by the user.

Beneficial effects in this embodiment of the present invention are as follows: By combining gesture recognition and a voice recognition command, or combing gesture recognition and a lip recognition command, or combining gesture recognition and a brain wave recognition command, or combining gesture recognition and line-of-sight tracking, a user can repeat a command by using multiple means to strengthen a command expected to be executed; a system recognizes that multiple repeated commands from the user emphasize only one command, and does not execute the command repeatedly, which avoids a misoperation caused by multiple repeated gestures of the user. Correctness and reliability of non-contact gesture control are improved by using technologies of the present invention.

Figure 9:
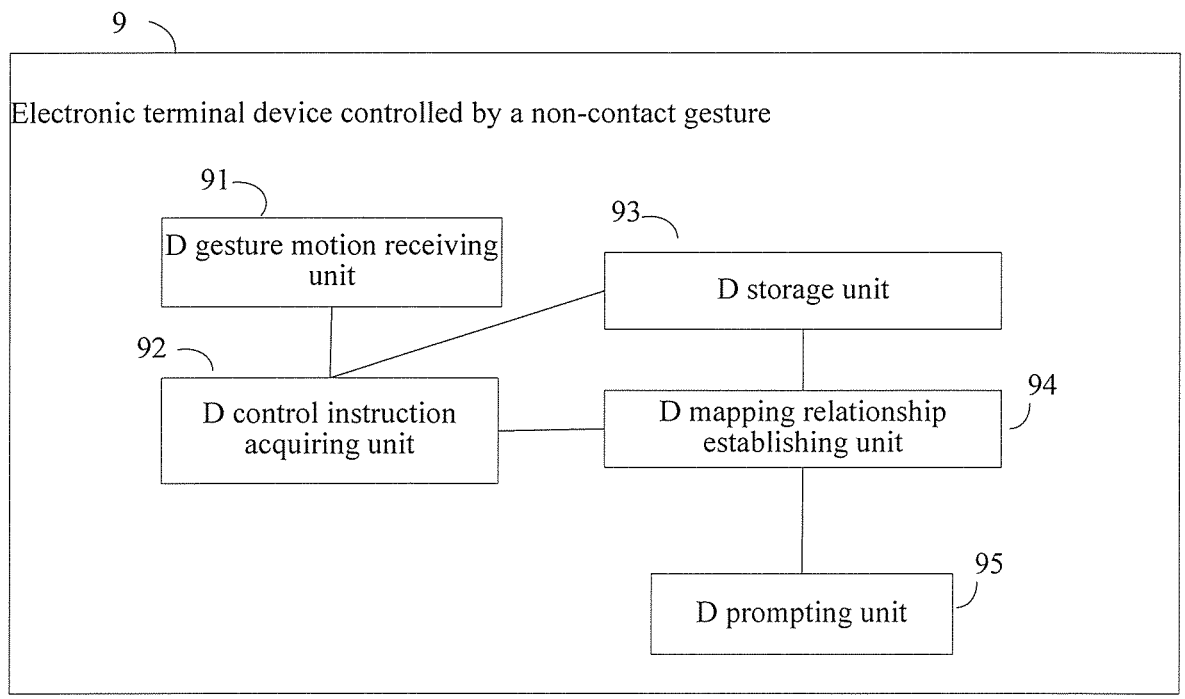
FIG. 9 is a function block diagram of an electronic terminal device controlled by a non-contact gesture according to Embodiment 8 of the present invention.

FIG. 9 shows a composition block diagram of function modules of an electronic terminal device controlled by a non-contact gesture according to Embodiment of the present invention, and for ease of description, only a part related to this embodiment of the present invention is shown. The electronic terminal device 9 controlled by a non-contact gesture includes: a D gesture motion receiving unit 91, a D control instruction acquiring unit 92, a D storage unit 93, and a D mapping relationship establishing unit 94, and a specific function of each unit is as follows:

The D gesture motion receiving unit 91 is configured to receive a D1 gesture motion of a user and a D2 gesture motion after the D1 gesture motion, where the D1 gesture motion and the D2 gesture motion are not in contact with the electronic terminal device 9, and composition and implementation manners of the D gesture motion receiving unit 91 are the same as those of the A gesture motion receiving unit 71 in Embodiment in the foregoing, and are not further described herein.

The D control instruction acquiring unit 92 is configured to obtain, according a pre-stored mapping relationship between a gesture motion and a control instruction, a D1 control instruction corresponding to the D1 gesture motion that is received by the D gesture motion receiving unit 91 and a D2 control instruction corresponding to the D2 gesture motion that is received by the D gesture motion receiving unit 91, where the D1 control instruction and the D2 control instruction are used to control the electronic terminal device 9.

The D storage unit 93 is configured to: when the D2 control instruction is a cancellation instruction, record the number of times for which the D2 control instruction is the cancellation instruction, where the cancellation instruction is used to instruct to cancel execution of the D1 control instruction.

The D mapping relationship establishing unit 94 is configured to: establish and store the mapping relationship between a gesture motion and a control instruction; and when it is determined that the number of times for which the D2 control instruction is the cancellation instruction and which is recorded by the D storage unit 93 reaches or exceeds the preset number of cancellation times, re-set a gesture motion corresponding to the D1 control instruction in the mapping relationship to reduce misrecognition of the gesture motion, where the preset number of cancellation times may be set by the user by means of configuration, and may also be preset before the electronic terminal device is delivered from the factory.

Further, the electronic terminal device described in this embodiment of the present invention further includes a D prompting unit 95, configured to: when the number of times for which the D2 control instruction is the cancellation instruction reaches or exceeds the preset number of cancellation times, prompt the user to cancel a mapping relationship between the D1 gesture motion and the D1 control instruction, where the prompting unit may be a display or a horn.

Beneficial effects in this embodiment of the present invention are as follows: The electronic terminal device controlled by a non-contact gesture in the present invention recognizes a misoperation of a command of non-contact gesture control and adjusts a gesture motion that is often misrecognized, so as to improve recognition accuracy of anon-contact gesture control instruction, thereby improving control correctness and reliability.

Figure 10:
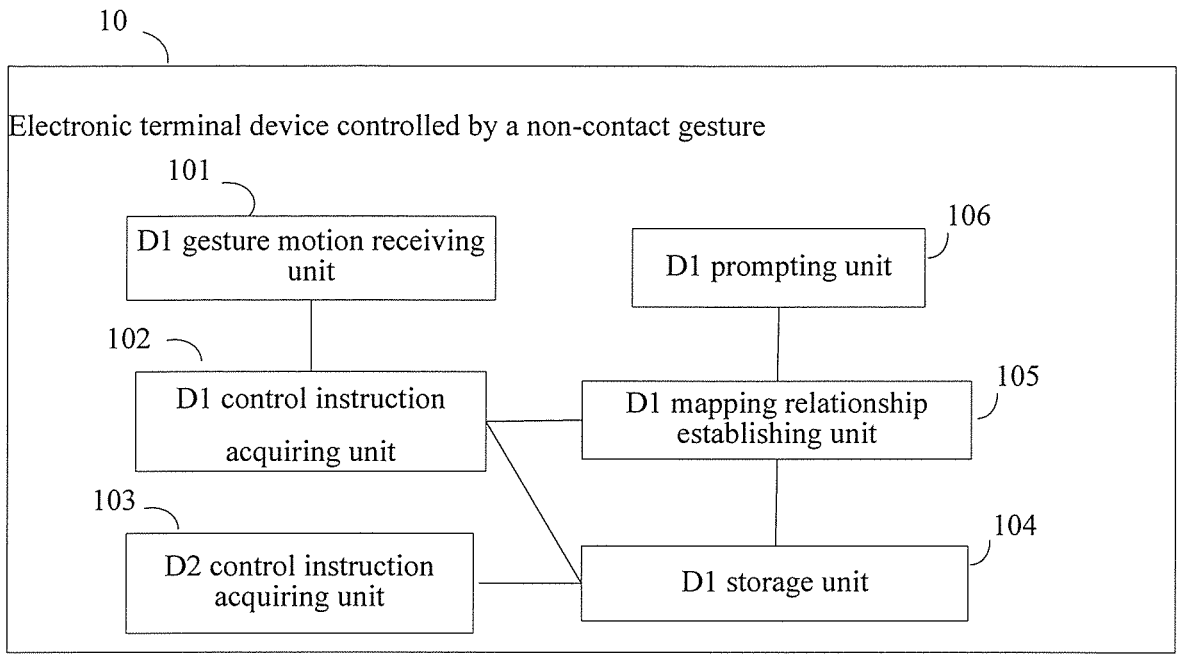
FIG. 10 is a function block diagram of an electronic terminal device controlled by a non-contact gesture according to Embodiment 9 of the present invention.

FIG. 10 shows a composition block diagram of function modules of an electronic terminal device controlled by a non-contact gesture according to Embodiment of the present invention, and for ease of description, only a part related to this embodiment of the present invention is shown. The electronic terminal device 10 controlled by a non-contact gesture includes: a D1 gesture motion receiving unit 101, a D1 control instruction acquiring unit 102, a D2 control instruction acquiring unit 103, a D1 storage unit 104, and a D1 mapping relationship establishing unit 105, and a specific function of each unit is as follows:

The D1 gesture motion receiving unit 101 is configured to receive an D1 gesture motion of a user, where the D1 gesture motion is not in contact with the electronic terminal device; and composition and implementation manners of the D1 gesture motion receiving unit 101 are the same as those of the A gesture motion receiving unit 71 in Embodiment in the foregoing, and are not further described herein.

The D1 control instruction acquiring unit 102 is configured to obtain, according to a pre-stored mapping relationship between a gesture motion and a control instruction, a D1 control instruction corresponding to the D1 gesture motion that is received by the D1 gesture motion receiving unit 101, where the D1 control instruction is used to control the electronic terminal device 10.

The D2 control instruction acquiring unit 103 is configured to obtain a D2 control instruction, where the D2 control instruction is used to control the electronic terminal device 10.

The D1 storage unit 104 is configured to: when the D2 control instruction is a cancellation instruction, record the number of times for which the D2 control instruction is the cancellation instruction, where the cancellation instruction is used to instruct to cancel execution of the D1 control instruction.

The D1 mapping relationship establishing unit 105 is configured to establish and store the mapping relationship between a gesture motion and a control instruction; and when it is determined that the number of times for which the D2 control instruction is the cancellation instruction and which is recorded by the D1 storage unit 104 reaches or exceeds the preset number of cancellation times, re-set a gesture motion corresponding to the D1 control instruction in the mapping relationship to eliminate misrecognition of the gesture motion, where the preset number of cancellation times may be set by the user by means of configuration, and may also be preset before the electronic terminal device is delivered from the factory.

Figure 10A:
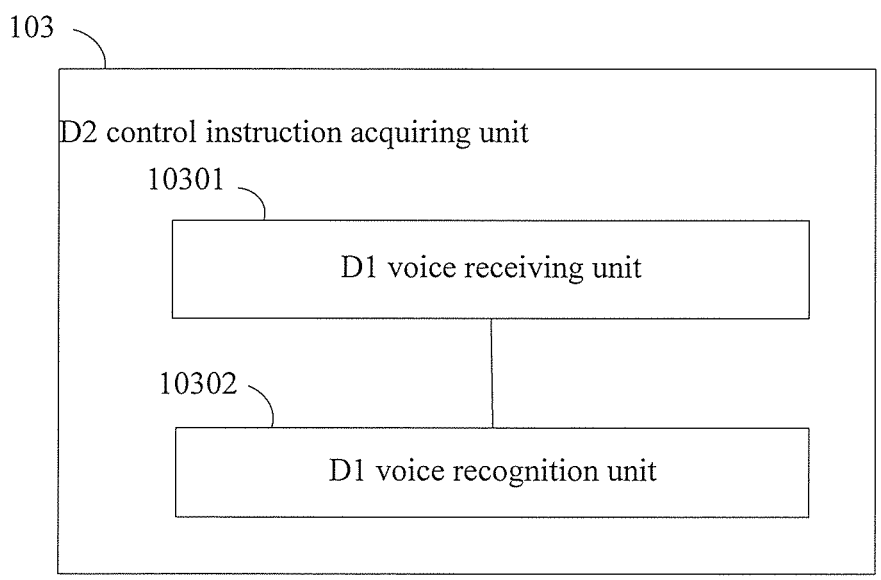
FIG. 10a, FIG. 10b, and FIG. 10c are composition block diagrams of three manner sub-functions of a D2 control instruction acquiring unit according to Embodiment 9.

In Embodiment of the present invention, further, as shown in FIG. 10a, the D2 control instruction acquiring unit 103 may include a D1 voice receiving unit 10301 and a D1 voice recognition unit 10302, where:

the D1 voice receiving unit 10301 is configured to receive a D1 voice command of the user; and the D1 voice recognition unit 10302 is configured to recognize the D1 voice command received by the D1 voice receiving unit 10301; and obtain the D2 control instruction corresponding to the D1 voice command.

Figure 10B:
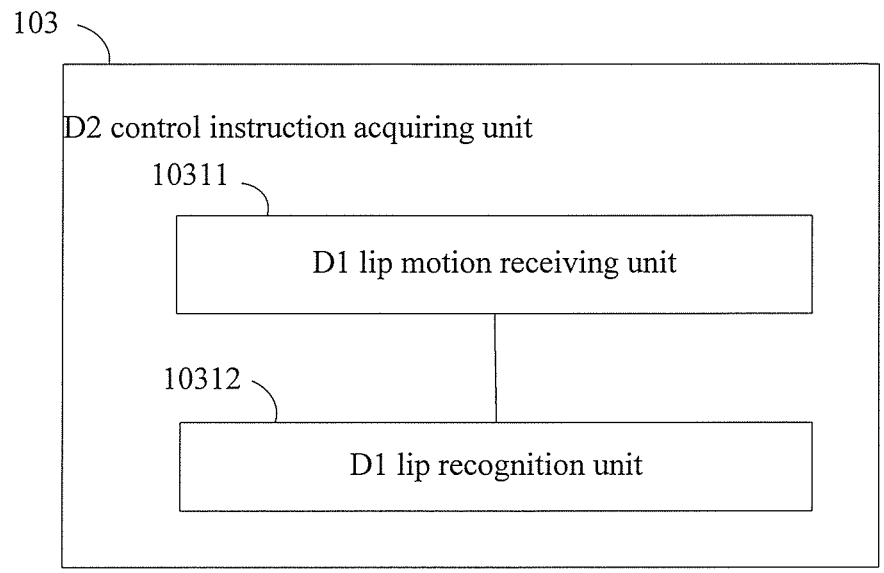

Alternative manner 1: As shown in FIG. 10b, the D2 control instruction acquiring unit 103 may include a D1 signal which shows lip motion receiving unit 10311 and a D1 lip recognition unit 10312, where:

the D1 signal which shows lip motion receiving unit 10311 is configured to receive a D1 signal which shows lip motion of the user; and the D1 lip recognition unit 10312 is configured to recognize the D1 signal which shows lip motion received by the D1 signal which shows lip motion receiving unit 10311; and obtain the D2 control instruction corresponding to the D1 signal which shows lip motion.

Figure 10C:
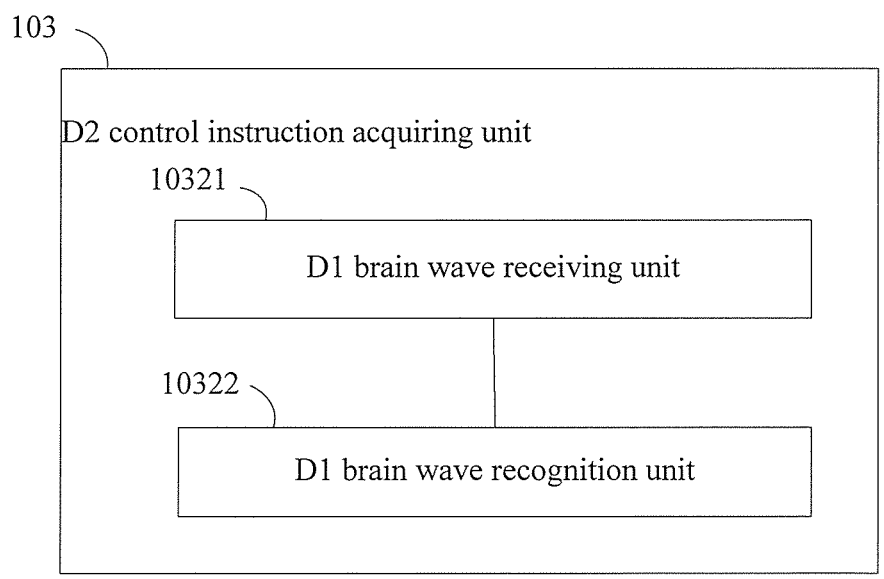

Alternative manner 2: As shown in FIG. 10c, the D2 control instruction acquiring unit 103 may include a D1 brain wave receiving unit 10321 and a D1 brain wave recognition unit 10322, where:

the D1 brain wave receiving unit 10321 is configured to receive a D1 brain wave signal of the user; and the D1 brain wave recognition unit 10322 is configured to recognize the D1 brainwave signal received by the D1 brainwave receiving unit 10321; and obtain the D2 control instruction corresponding to the D1 brain wave signal.

Further, the electronic terminal device 10 described in Embodiment of the present invention further includes a D1 prompting unit 106, configured to: when the number of times for which the D2 control instruction is the cancellation instruction reaches or exceeds the preset number of cancellation times, prompt the user to cancel a mapping relationship between the D1 gesture motion and the D1 control instruction, where the prompting unit may be a display or a horn.

Beneficial effects in this embodiment of the present invention are as follows: The electronic terminal device controlled by a non-contact gesture in the present invention recognizes a misoperation of a command of non-contact gesture control and adjusts a gesture motion that is often misrecognized, so as to improve recognition accuracy of anon-contact gesture control instruction, thereby improving control correctness and reliability.

What is claimed is:

1. A non-contact gesture control method for controlling an electronic terminal device, the method comprising:
  receiving a first input from a user of the electronic terminal device, wherein the first input is a gesture motion of the user, and wherein the gesture motion is not in contact with the electronic terminal device;
  obtaining, according to a pre-stored mapping relationship, a first control instruction corresponding to the gesture motion,
    wherein the first control instruction is associated with enabling the electronic terminal device to perform a first operation on a controlled object corresponding to the first control instruction, and
    wherein the controlled object is displayed on the electronic terminal device;
  receiving a second input from the user within a preset delay period from receiving the gesture motion;
  obtaining, according to a pre-stored mapping relationship, a second control instruction corresponding to the second input,
    wherein the second control instruction is associated with enabling the electronic terminal device to perform a second operation on the controlled object;
  comparing the first control instruction with the second control instruction, wherein the comparison is accomplished by comparing operations associated with the first and second control instructions; and
  when the first control instruction is consistent with the second control instruction and the second control instruction occurs within the preset delay period, the electronic terminal device does not perform the second operation corresponding to the second control instruction on the controlled object, or when the first control instruction is inconsistent with the second control instruction within the preset delay period, the electronic terminal device performs the second operation corresponding to the second control instruction on the controlled object, wherein receiving the second input comprises one of:
receiving another gesture motion of the user,
receiving a voice command of the user,
receiving a signal that shows a lip motion of the user, or
receiving a brain wave signal of the user.

2. The non-contact gesture control method according to claim 1, wherein the method further comprises performing, by the electronic terminal device, the first operation on the controlled object according to the first control instruction.

3. The non-contact gesture control method according to claim 1, wherein the preset delay period is less than 3 seconds.

4. The non-contact gesture control method according to claim 1, wherein receiving the second input comprises receiving the signal that shows the lip motion of the user, and wherein obtaining the second control instructions comprises:
recognizing the signal to obtain a text command; and
obtaining, according to the pre-stored mapping relationship, the second control instruction corresponding to the text command.

5. The non-contact gesture control method according to claim 1, wherein receiving the second input comprises receiving the voice command of the user, and wherein obtaining the second control instructions comprises:
recognizing the voice command to obtain a text command; and
obtaining, according to the pre-stored mapping relationship, the second control instruction corresponding to the text command.

6. The non-contact gesture control method according to claim 1, the method further comprising:
before receiving the gesture motion of the user:
obtaining a line-of-sight focus of the user, and
determining that an object displayed on the electronic terminal device is the controlled object based on the line-of-sight focus of the user.

7. An electronic terminal device controlled by a non-contact gesture, the electronic terminal device comprising:
a processor configured to:
receive a first input from a user of the electronic terminal device, wherein the first input is a gesture motion of the user, and wherein the gesture motion is not in contact with the electronic terminal device;
obtain, according to a pre-stored mapping relationship, a first control instruction corresponding to the gesture motion, wherein the first control instruction is used to control a controlled object displayed on the electronic terminal device;
record a time interval between receiving the gesture motion and receiving a second input;
obtain, according to the pre-stored mapping relationship, a second control instruction corresponding to the second input, wherein the second control instruction is used to control the controlled object;
perform a first operation corresponding to the first control instruction on the controlled object displayed on the electronic terminal device; and
when the time interval is less than a preset time:

compare the second control instruction with the first control instruction wherein the comparison is accomplished by comparing operations associated with the first and second control instructions,
determine whether the second control instruction is consistent with the first control instruction so that the second control instruction is a repeat of the first control instruction, and
when the second control instruction is consistent with the first control instruction within the preset time, skip performing a second operation corresponding to the second control instruction on the controlled object, or
when the second control instruction is inconsistent with the first control instruction within the preset time, perform the second operation corresponding to the second control instruction on the controlled object,
wherein receiving the second input comprises one of:
receiving another gesture motion of the user,
receiving a voice command of the user,
receiving a signal that shows a lip motion of the user, or
receiving a brain wave signal of the user.

8. The electronic terminal device of claim 7, wherein the preset time is less than 3 seconds.

9. The electronic terminal device of claim 7, wherein receiving the second input comprises receiving the signal that shows the lip motion of the user, and wherein obtaining the second control instructions comprises:
recognizing the signal to obtain a text command; and
obtaining, according to the pre-stored mapping relationship, the second control instruction corresponding to the text command.

10. The electronic terminal device of claim 7, wherein receiving the second input comprises receiving the voice command of the user, and wherein obtaining the second control instructions comprises:
recognizing the voice command to obtain a text command; and
obtaining, according to the pre-stored mapping relationship, the second control instruction corresponding to the text command.

11. The electronic terminal device of claim 7, wherein the processor is further configured to:
before receiving the gesture motion of the user:
obtain a line-of-sight focus of the user, and
determine that an object displayed on the electronic terminal device is the controlled object based on the line-of-sight focus of the user.

12. An electronic terminal device controlled by a non-contact gesture, the electronic terminal device comprising:
a processor configured to:
receive a first input from a user of the electronic terminal device, wherein the first input is a gesture motion of the user, and wherein the gesture motion is not in contact with the electronic terminal device;
obtain, according to a pre-stored mapping relationship, a first control instruction corresponding to the gesture motion, wherein the first control instruction is used to control a controlled object displayed on the electronic terminal device;
receive a second input from the user;
obtain, according to the pre-stored mapping relationship, a second control instruction corresponding to the second input, wherein the second control instruction is used to control the controlled object displayed on the electronic terminal device;

record a time interval between obtaining the first control instruction and obtaining the second control instruction;

when the time interval is less than a preset time:
compare the first control instruction with the second control instruction wherein the comparison is accomplished by comparing operations associated with the first and second control instructions,
determine whether the first control instruction is consistent with the second control instruction, and
perform a first operation corresponding to the first control instruction on the controlled object displayed on the electronic terminal device, and
when the first control instruction is consistent with the second control instruction within the preset delay period, the second control instruction is determined to be a repeat of the first control instruction, and a second operation corresponding to the second control instruction is not performed, or
when the first control instruction is inconsistent with the second control instruction within the preset delay period, the second operation corresponding to the second control instruction on the controlled object is performed, wherein the preset time is less than three seconds, and wherein receiving the second input comprises one of:
receiving a second another gesture motion of the user,
receiving a voice command of the user,
receiving a signal that shows a lip motion of the user, or
receiving a brain wave signal of the user.

13. The electronic terminal device of claim 12, wherein the preset time is less than 3 seconds.

14. The electronic terminal device of claim 12, wherein receiving the second input comprises receiving the signal that shows the lip motion of the user, and wherein obtaining the second control instructions comprises:
recognizing the signal to obtain a text command; and
obtaining, according to the pre-stored mapping relationship, the second control instruction corresponding to the text command.

15. The electronic terminal device of claim 12, wherein receiving the second input comprises receiving the voice command of the user, and wherein obtaining the second control instructions comprises:
recognizing the voice command to obtain a text command; and
obtaining, according to the pre-stored mapping relationship, the second control instruction corresponding to the text command.

16. The electronic terminal device of claim 12, wherein the processor is further configured to:
before receiving the gesture motion of the user:
obtain a line-of-sight focus of the user, and
determine that an object displayed on the electronic terminal device is the controlled object based on the line-of-sight focus of the user.

* * * * *